(12) United States Patent
Kanai

(10) Patent No.: US 8,108,941 B2
(45) Date of Patent: Jan. 31, 2012

(54) PROCESSOR, MEMORY, COMPUTER SYSTEM, SYSTEM LSI, AND METHOD OF AUTHENTICATION

(75) Inventor: Tatsunori Kanai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 952 days.

(21) Appl. No.: 11/350,798

(22) Filed: Feb. 10, 2006

(65) Prior Publication Data
US 2007/0180536 A1  Aug. 2, 2007

(30) Foreign Application Priority Data

Mar. 29, 2005 (JP) ................................. 2005-096355
Aug. 5, 2005 (JP) ................................. 2005-228669

(51) Int. Cl.
*H04N 7/16* (2011.01)

(52) U.S. Cl. .................... 726/30; 726/2; 726/8; 726/11; 709/225; 709/229; 713/168; 713/169; 713/170; 713/171; 713/172; 713/173; 713/174; 713/182; 713/183; 713/184; 713/185; 713/186

(52) U.S. Cl. ..............................................................
(58) Field of Classification Search .......... 711/100–103; 713/189, 193, 155–159, 182–186; 726/2, 726/34, 35, 26, 27–30, 8, 11; 709/229, 225
See application file for complete search history.

(56) References Cited

U.S. PATENT DOCUMENTS

| 4,965,828 | A | * | 10/1990 | Ergott et al. ................... 713/193 |
| 5,237,609 | A | * | 8/1993 | Kimura .......................... 713/193 |
| 5,301,346 | A | * | 4/1994 | Notarianni et al. ........... 700/267 |
| 6,490,687 | B1 | * | 12/2002 | Nagai .............................. 726/9 |
| 2002/0064074 | A1 | * | 5/2002 | Kamise et al. ................ 365/200 |
| 2003/0188000 | A1 | * | 10/2003 | Kojima .......................... 709/229 |
| 2004/0139316 | A1 | * | 7/2004 | Kotani .......................... 713/156 |
| 2005/0228993 | A1 | * | 10/2005 | Silvester et al. .............. 713/168 |

FOREIGN PATENT DOCUMENTS

JP         2003-108257         4/2003

\* cited by examiner

*Primary Examiner* — Taghi Arani
*Assistant Examiner* — Josnel Jeudy
(74) *Attorney, Agent, or Firm* — Finnegan, Henderson, Farabow, Garrett & Dunner, L.L.P.

(57) ABSTRACT

A processor, connected to a non-volatile memory storing first memory authentication information for authentication of the non-volatile memory, the processor includes an operation unit configured to perform an operation utilizing information stored in the non-volatile memory; an authentication memory formed integrally with the operation unit, and storing second memory authentication information for authentication of the non-volatile memory; an authentication information acquiring unit configured to acquire the first memory authentication information from the non-volatile memory; a memory authenticating unit configured to compare the first memory authentication information and the second memory authentication information to authenticate the non-volatile memory; and a memory access controlling unit configured to permit an access to the non-volatile memory when the memory authenticating unit succeeds in authentication.

21 Claims, 19 Drawing Sheets

PROCESSOR, MEMORY, COMPUTER SYSTEM, SYSTEM LSI, AND METHOD OF AUTHENTICATION

CROSS-REFERENCE TO RELATED APPLICATIONS

This application is based upon and claims the benefit of priority from the prior Japanese Patent Application Nos. 2005-096355, filed on Mar. 29, 2005 and 2005-228669, filed on Aug. 5, 2005; the entire contents of which are incorporated herein by reference.

BACKGROUND OF THE INVENTION

1. Field of the Invention

The present invention relates to a processor, a memory, a computer system, a system large scale integrated circuit (LSI), and a method of authentication.

2. Description of the Related Art

Computers are incorporated into various devices such as digital cameras, digital televisions, digital versatile disk (DVD) players, DVD/HDD recorders, game consoles, portable telephones, portable audio players, and control units of automobiles. The devices and the systems incorporating the computer process the data which includes contents whose copyrights need to be protected. In addition, these devices and systems handle important information such as personal information and charging information.

While using these devices and systems, the user might commit illegal acts such as illegal alteration of the device and system, illegal copying of decrypted contents, execution of illegal programs for acquisition of personal information, and alteration of charging information, which is increasingly problematic.

A conventional technique aims at protecting the device and the system from illegal acts by resin coating a substrate on which an LSI chip is incorporated in the device or the system, fabricating a hard-to-disassemble casing for the device, for example, thereby making the alteration more difficult.

According to another conventional technique, a Digital Signal Processor (DSP) reads out boot software from an internal Read Only Memory (ROM), and the boot software authenticates the device based on device/maker identification codes. Only when the device is authenticated, the boot is executed (see, Japanese Patent Application Laid-Open 2003-108257, for example).

Further, according to sill another conventional technique, secure booting blocks an execution of program codes other than authenticated legal program codes to prevent an execution of overwritten illegal program codes. A. security chip called Trusted Platform Module (TPM) is known to be employed for the implementation of the secure booting.

The resin coating and the enforcement of the casing are not advantageous since they increase manufacturing cost and are easily nullified by a special processing technique.

On the other hand, the secure booting also has some disadvantages as it requires a specific hardware module such as the TPM. The TPM of each device has a specific encryption key which is different from device to device. Hence, when a program which is executed on the device needs to be updated, an updated program to be distributed must be constructed so as to allow for the authentication by different encryption keys of respective devices, whereby the maintenance cost significantly increases.

In addition, though the secure booting can confirm the activation of a predetermined program, is unable to readily detect program leakage or the alteration of the hardware.

SUMMARY OF THE INVENTION

According to one aspect of the present invention, a processor connected to a non-volatile memory storing first memory authentication information for authentication of the non-volatile memory, the processor includes an operation unit configured to perform an operation utilizing information stored in the non-volatile memory; an authentication memory formed integrally with the operation unit, and storing second memory authentication information for authentication of the non-volatile memory; an authentication information acquiring unit configured to acquire the first memory authentication information from the non-volatile memory; a memory authenticating unit configured to compare the first memory authentication information and the second memory authentication information to authenticate the non-volatile memory; and a memory access controlling unit configured to permit an access to the non-volatile memory when the memory authenticating unit succeeds in authentication.

According to another aspect of the present invention, a memory, connected to a processor storing first memory authentication information for authentication of the processor, the memory includes a non-volatile memory storing information which is utilized by an operation unit; an authentication memory formed integrally with the non-volatile memory, and storing second processor authentication information for authentication of the operation unit; an authentication information acquiring unit configured to acquire the first processor authentication information from the operation unit; a processor authenticating unit configured to compare the first processor authentication information and the second processor authentication information to authenticate the operation unit; and a processor access controlling unit configured to permit an access from the operation unit when the processor authenticating unit succeeds in authentication.

According to still another aspect of the present invention, a computer system includes a processor and a memory that stores information utilized by the processor, the memory including a non-volatile memory storing information utilized by the processor, and a first authentication memory formed integrally with the non-volatile memory, and storing first memory authentication information utilized for authentication of the non-volatile memory, and the processor including an operation unit configured to perform an operation utilizing the information stored in the non-volatile memory, a second authentication memory formed integrally with the operation unit, and storing second memory authentication information for authentication of the non-volatile memory, a memory authentication information acquiring unit configured to acquire the first memory authentication information stored by the first authentication memory, a memory authenticating unit configured to compare the first memory authentication information acquired by the memory authentication information acquiring unit and the second memory authentication information to authenticate the non-volatile memory, and a memory access controlling unit configured to permit an access to the non-volatile memory when the memory authenticating unit succeeds in authentication of the non-volatile memory.

According to still another aspect of the present invention, a method of authentication in a computer system including an operation unit includes performing authentication between the operation unit and a non-volatile memory, by comparing first authentication information stored in a first authentication memory that is formed integrally with the non-volatile memory that stores information utilized by the operation unit, and stores the second authentication information for authentication between the operation unit and the non-volatile memory, and second authentication information stored in a second authentication information memory that is formed integrally with the operation unit, and stores the second authentication information; and controlling an access so as to permit an access between the non-volatile memory and the operation unit when the authentication is successful in the step of performing authentication.

According to still another aspect of the present invention, z system large scale integrated circuit includes a processor core configured to perform an operation utilizing information stored in a non-volatile memory; a first authentication memory formed integrally with the processor core, and storing first memory authentication information for authentication of the non-volatile memory; a second authentication memory formed integrally with the non-volatile memory, and storing second memory authentication information for authentication of the non-volatile memory; a authentication information acquiring unit configured to acquire the second authentication information; a memory authenticating unit configured to compare the second authentication information acquired by the authentication information acquiring unit and the first memory authentication information; and a memory access controlling unit configured to permit an access to the non-volatile memory when the memory authenticating unit succeeds in authentication.

According to still another aspect of the present invention, a computer system includes a system large scale integrated circuit, and a memory that stores information utilized in the system large scale integrated circuit, the memory including a non-volatile memory configured to store information utilized by the processor core, and a first authentication memory integrally formed with the non-volatile memory, and storing first authentication information utilized for authentication of the non-volatile memory, and the system large scale integrated circuit including a processor core configured to perform an operation utilizing the information stored in the non-volatile memory, a second authentication memory formed integrally with the processor core, and storing second authentication information for authentication of the non-volatile memory, an authentication information acquiring unit configured to acquire the first authentication information stored by the first authentication memory, a memory authenticating unit configured to compare the first memory authentication information acquired by the authentication information acquiring unit and the second authentication information to authenticate the non-volatile memory, and a memory access controlling unit which permits an access to the non-volatile memory when the memory authenticating unit succeeds in authentication of the non-volatile memory.

According to still another aspect of the present invention, a computer system includes a system large scale integrated circuit and a memory that stores information utilized in the system large scale integrated circuit, the system large scale integrated circuit including a processor core configured to perform an operation, and a first authentication memory formed integrally with the processor core, and storing first authentication information utilized for authentication of the processor core, and the memory including a non-volatile memory storing information utilized by the processor core, a second authentication memory formed integrally with the non-volatile memory, and storing second authentication information for authentication of the operation unit, a authentication information acquiring unit configured to acquire the first authentication information, a processor authenticating unit configured to compare the first authentication information acquired by the authentication information acquiring unit and the second authentication information to authenticate the operation unit, and a processor access controlling unit configured to permit an access from the operation unit when the processor authenticating unit succeeds in authentication.

DETAILED DESCRIPTION OF THE PREFERRED EMBODIMENTS

A processor, a memory, a computer system, a system LSI and a method of authentication according to exemplary embodiments of the present invention will be described in detail with reference to the accompanying drawings. It should be noted that the present invention is not limited by the embodiments.

Figure 1:
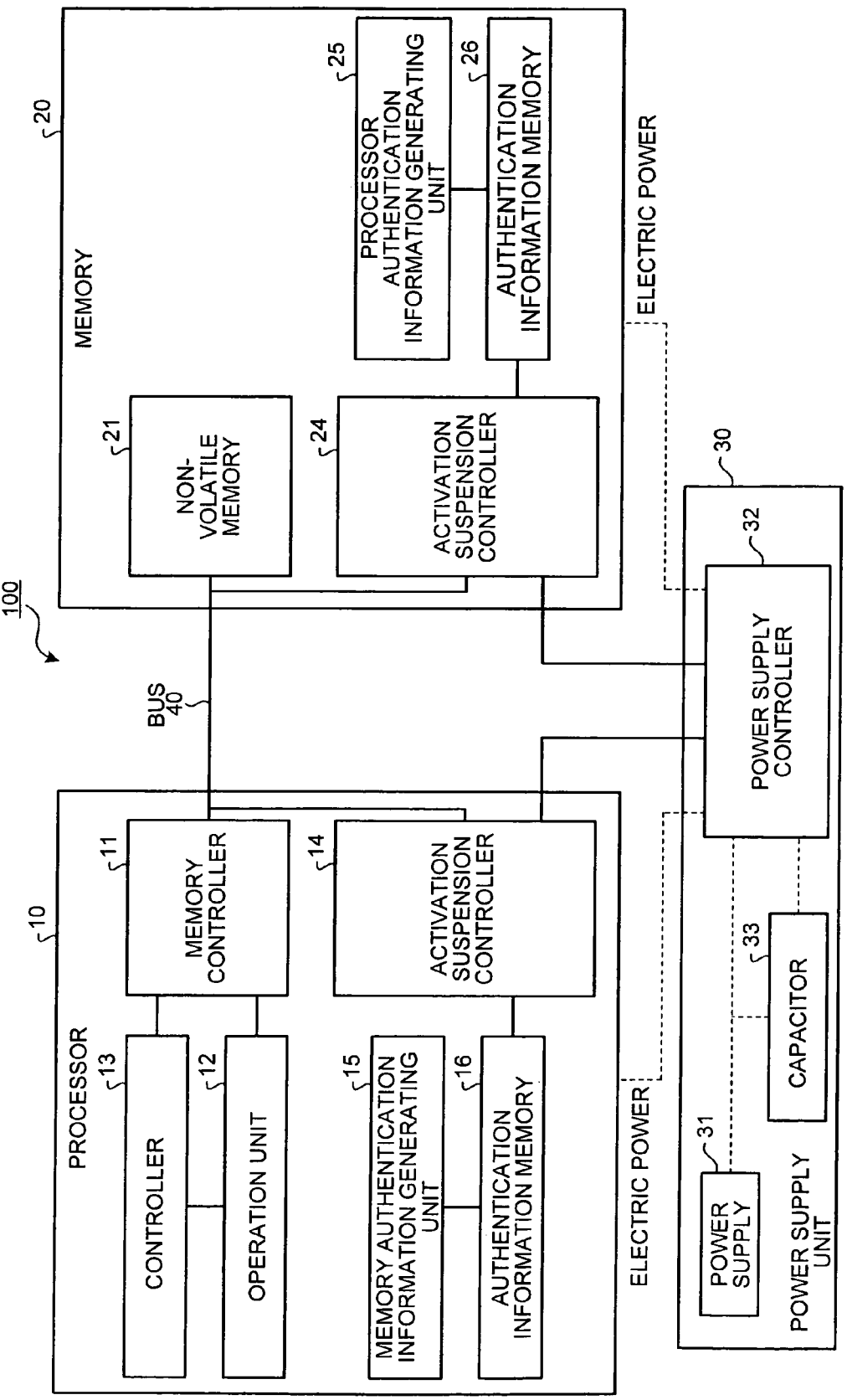
FIG. 1 is a diagram of an overall structure of a computer system according to a first embodiment.

FIG. 1 is a diagram of an overall structure of a computer system 100 according to a first embodiment. The computer system 100 includes a processor 10, a memory 20, a power supply unit 30, and a bus 40.

The processor 10 includes a memory controller 11, an operation unit 12, a controller 13, an activation suspension controller 14, a memory authentication information generating unit 15, and an authentication information memory 16. The memory controller 11 reads out a program or data from the memory 20, and writes data into the memory 20. The operation unit 12 has a register to temporarily store data. The operation unit 12 acquires data from the memory 20 and processes data with the use of the register. The controller 13 manages the execution of a program on the operation unit 12.

The activation suspension controller 14 performs processing at the start-up and the suspension of the operation of the processor 10. More specifically, the activation suspension controller 14 manages the memory authentication information generating unit 15 and the authentication information memory 16, to authenticate the memory 20 at the start-up of the operation and to generate authentication information for the authentication at the suspension of the operation. The activation suspension controller 14 also transmits/receives information to/from the memory 20 via the bus 40.

Thus, the activation suspension controller 14 may serve as at least one of a memory authentication information acquiring unit, a memory authenticating unit, a memory access controlling unit, a power supply start detecting unit, a power supply suspension detecting unit, and a transferring unit.

The memory authentication information generating unit 15 generates memory authentication information for authenticating the memory 20 according to an instruction from the activation suspension controller 14. The authentication information memory 16 stores the memory authentication information generated by the memory authentication information generating unit 15. The authentication information memory 16 further stores processor authentication information. The processor authentication information is information utilized by the memory 20 to authenticate the processor 10. The processor authentication information is acquired from the memory 20 by the activation suspension controller 14.

The authentication information memory 16 is a non-volatile memory. Hence, even when the power supply stops, the data stored in the authentication information memory 16 is not erased but retained. The non-volatile memory is, for example, an Electrically Erasable Programmable Read Only Memory (EEPROM), or a flash memory. The authentication information memory 16 can be any non-volatile memory and the type thereof is not limited by the embodiments.

The processor 10 is integrally fabricated as a single device. More specifically, respective elements of the processor 10 are mounted on one chip. Alternatively, the respective elements of the processor 10 are formed into one package. Here, integral formation of respective elements of the processor 10 means physical integration of the elements. Preferably, the processor 10 is formed so that each element does not function when separated from other elements.

The memory 20 includes a non-volatile memory 21, an activation suspension controller 24, a processor authentication information generating unit 25, and an authentication information memory 26.

The non-volatile memory 21 is a high-speed memory. More specifically, the non-volatile memory 21 is, for example, a Magnetic Random Access Memory (MRAM), a Ferroelectric RAM (FeRAM), or a Phase-Change RAM (PRAM). Hence, even when the power supply stops, the data stored in the non-volatile memory 21 is not erased but retained. Thus, the non-volatile memory 21 can store a state at the cutoff of the power supply, and at the resumption of the power supply the device can restart the operation from the state at the cutoff of the power supply.

The non-volatile memory 21 is connected to the processor 10 via the bus 40. On the bus 40, three types of signals, i.e., an address signal for designating a memory, a data signal corresponding to the designated address, and a control signal designating reading or writing, are delivered.

The activation suspension controller 24 performs processing at the start-up and at the suspension of the operation of the memory 20. More specifically, the activation suspension controller 24 manages the processor authentication information generating unit 25 and the authentication information memory 26, to authenticate the processor 10 at the start-up of the operation and to generate authentication information for the authentication at the suspension of the operation. The activation suspension controller 24 also transmits/receives information to/from the processor 10 via the bus 40.

The processor authentication information generating unit 25 generates the processor authentication information for authentication of the processor 10 according to an instruction from the activation suspension controller 24. The authentication information memory 26 stores the processor authentication information generated by the processor authentication information generating unit 25. The authentication information memory 26 also stores the memory authentication information. The memory authentication information is acquired from the processor 10 by the activation suspension controller 24. The authentication information memory 26 is a non-volatile memory similar to the authentication information memory 16. Similarly to the processor 10, the memory 20 is integrally formed from the respective elements thereof.

The power supply unit 30 includes a power supply 31, a power supply controller 32, and a capacitor 33. The capacitor 33 stores electric power supplied from the power supply 31, and has a sufficient capacity for supplying electric power to the processor 10 and the memory 20 for a sufficient time for the processor 10 and the memory 20 to perform the suspension process. The suspension process will be described later. The power supply controller 32 controls the power supply 31 and the capacitor 33.

The computer system 100 further includes other various input/output devices not shown. The input/output device is, for example, a video processor which displays video data processed in the memory 20 on a display device.

Figure 2:
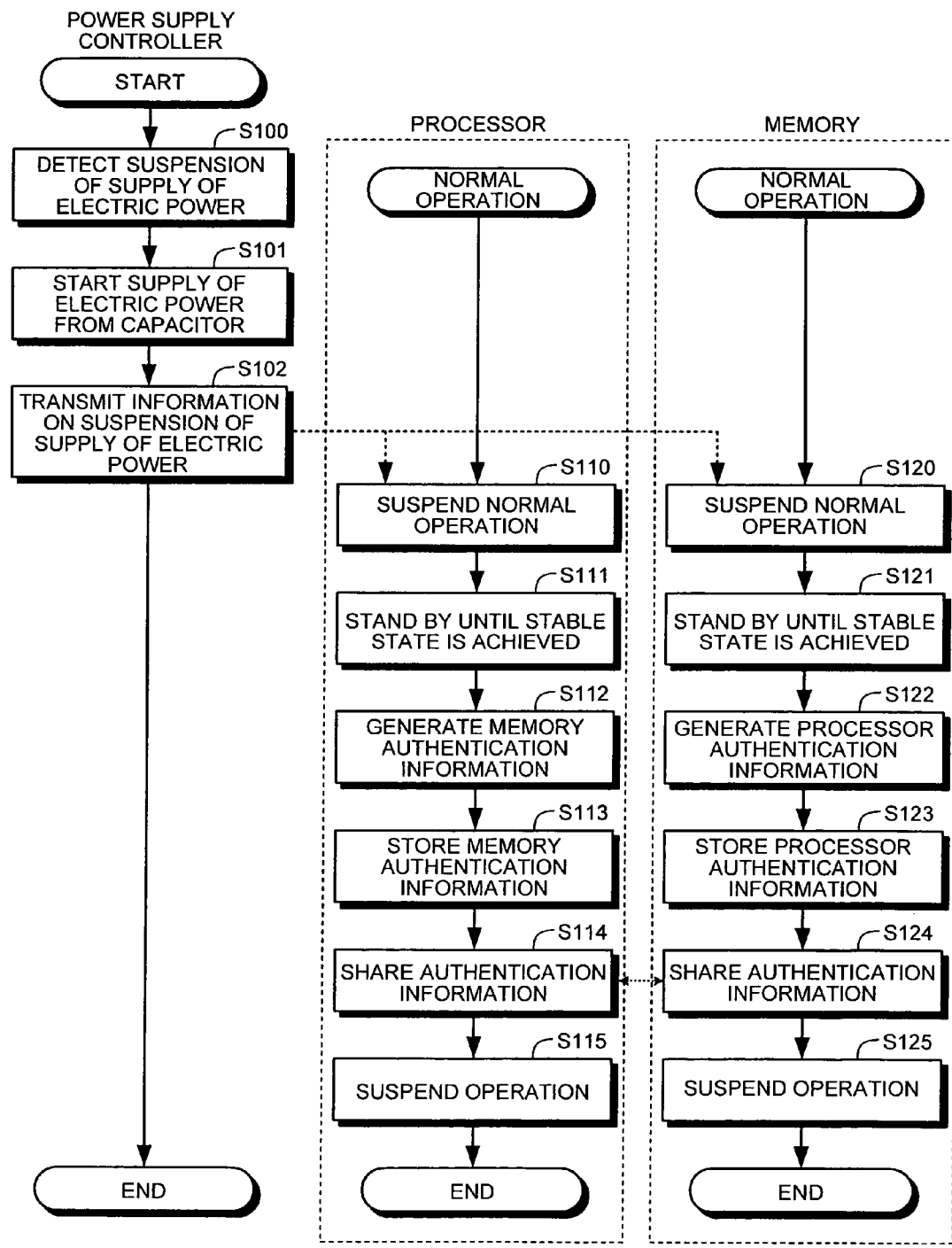
FIG. 2 is a flowchart of a suspension process which is executed when supply of electric power is cut off in the computer system according to the first embodiment.

FIG. 2 is a flowchart of the suspension process which is executed by the computer system 100 according to the first embodiment when the power supply stops.

When the power supply controller 32 detects a cutoff of the power supply, i.e., the suspension of the supply of electric power from the power supply 31 (step S100), the electric power stored in the capacitor 33 is supplied to the processor 10 and the memory 20 (step S101). Then, the operations of the processor 10 and the memory 20 continue. Further, the power supply controller 32 sends information on the cutoff of the power supply to the activation suspension controllers 14 and 24 (step S102).

On receiving the information on the cutoff of the power supply from the power supply controller 32, the activation suspension controllers 14 and 24 recognize the cutoff of the power supply and stop a normal operation which is underway when the information on the cutoff of the power supply is received (step S110, step S120).

The activation suspension controllers 14 and 24 stand by until the processor and the memory come into a stable state, i.e., until the processor and the memory are ready to resume the normal operation when the power is on again from the same state as the state at the reception of the information of the cutoff of the power supply (step S111, step S121).

For example, if the computer system is executing a memory access cycle when the information on the cutoff of the power supply is received, the activation suspension controllers 14 and 24 stand by until the memory access cycle ends. When the computer system is executing an instruction which is located in the middle of a pipeline of the processor, the activation suspension controllers 14 and 24 stand by until the processing of the pertinent instruction finishes.

In addition, when the memory, such as a register or a cache memory, included in the processor 10 is a volatile memory, internal states of the register and the cache memory are saved in the memory 20 to prepare for the start of the next operation.

When the processor 10 and the memory 20 stop the normal operation and come into the stable state, the memory authentication information generating unit 15 newly generates the memory authentication information according to an instruction from the activation suspension controller 14 (step S112). Similarly, the processor authentication information generating unit 25 newly generates the processor authentication information according to an instruction from the activation suspension controller 24 (step S122).

Thus, the memory authentication information generating unit 15 generates the memory authentication information after the cutoff of the power supply from the power supply 31 and before the cutoff of the power supply from the capacitor 33. The processor authentication information generating unit 25 generates the processor authentication information after the cutoff of the power supply from the power supply 31 and before the cutoff of the power supply from the capacitor 33.

Then, the authentication information memory 16 stores the memory authentication information generated by the memory authentication information generating unit 15 (step S113). Similarly, the authentication information memory 26 stores the processor authentication information generated by the processor authentication information generating unit 25 (step S123). Here, the memory authentication information and the processor authentication information are secret information for mutual authentication between the processor 10 and the memory 20. Hence, the memory authentication information and the processor authentication information need to be information which cannot be known to devices other than the processor and the memory.

The activation suspension controller 14, then sends the memory authentication information stored in the authentication information memory 16 to the activation suspension controller 24 via the bus 40. The activation suspension controller 24 stores the memory authentication information acquired from the activation suspension controller 14 in the authentication information memory 26.

Similarly, the activation suspension controller 24 sends the processor authentication information stored in the authentication information memory 26 to the activation suspension controller 14 via the bus 40. The activation suspension controller 14 stores the processor authentication information acquired from the activation suspension controller 24 in the authentication information memory 16.

Through the process as described above, the processor 10 and the memory 20 share the processor authentication information and the memory authentication information (step S114, step S124). Then, the processor 10 and the memory 20 stop operation (step S115, step S125). Thus, the suspension process completes.

Here, the processor authentication information and the memory authentication information are transmitted by secure means, to prevent leakage to the outside from being caused by an illegal monitoring of signals, for example. More specifically, the authentication information may be encrypted before the transmission.

Still alternatively, a secret key may be employed, i.e., the processor 10 and the memory 20 may set and share the secret key in advance. The authentication information is encrypted by the shared secret key before the transmission.

Still alternatively, a public key cryptosystem may be utilized. According to the public key cryptosystem, the processor 10 and the memory 20 each stores a secret key of itself and a public key of the other. The authentication information is encrypted by the public key of the counterpart before transmission.

Though here in the first embodiment the processor authentication information and the memory authentication information are transmitted via the bus 40, the computer system 100 may further include a signal line dedicated for the transmission of the authentication information. Then, the processor authentication information and the memory authentication information may be transmitted via the signal line dedicated for the transmission of the authentication information.

Figure 3:
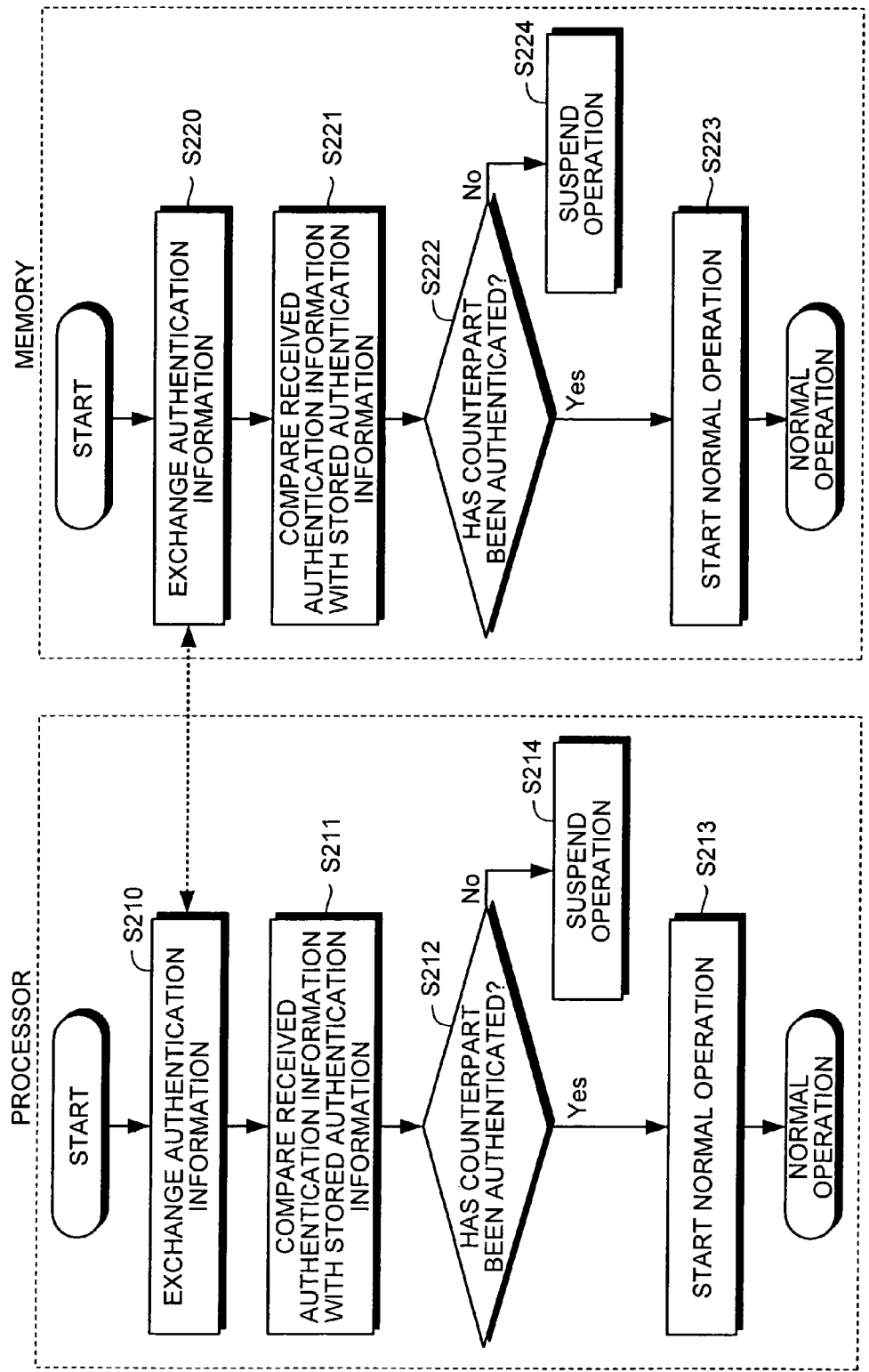
FIG. 3 is a flowchart of an authentication process which is executed when the supply of electric power resumes after the cutoff of the power supply in the computer system according to the first embodiment.

FIG. 3 is a flowchart of the authentication process which is performed by the computer system 100 according to the first embodiment when the power supply is resumed after the cutoff of the power supply. When the power supply is resumed, the processor 10 and the memory 20 exchange the memory authentication information and the processor authentication information shared at the suspension process of the power supply via the bus 40 (step S210, step S220). More specifically, the activation suspension controller 14 sends the processor authentication information stored in the authentication information memory 16 to the activation suspension controller 24 via the bus 40.

On the other hand, the activation suspension controller 24 sends the memory authentication information stored in the authentication information memory 26 to the activation suspension controller 14 via the bus 40. Here, the memory authentication information and the processor authentication information are transmitted in a secure manner, for example, by encryption.

Then, the activation suspension controller 14 compares the memory authentication information received from the activation suspension controller 24 and the memory authentication information generated by the memory authentication information generating unit 15 and stored in the authentication information memory 16 (step S211). When the two pieces of memory authentication information match, the activation suspension controller 14 determines that the authentication of the memory 20 is successful (Yes in step S212), and resumes the normal operation (step S213). Thus, the access to the memory 20 is permitted, and data reading from and data writing into the memory 20 start.

On the other hand, when the two pieces of memory authentication information do not match, the activation suspension controller 14 determines that the authentication of the memory 20 fails (No in step S212), and stops the operation (Step S214). When the two pieces of memory authentication information do not match, the memory 20 is in a different state from the state before the suspension of the power supply. In other words, the memory 20 may have been subjected to the illegal acts while the power is down. For example, it is possible that a malicious third party illegally access the memory 20. Or the memory 20 may be exchanged with other memory. Hence, in such cases the processor 10 stops the operation. In other words, the processor 10 does not access the memory 20. Thus, illegal acts such as illegal invasion into the processor 10 via the memory 20 can be prevented.

The process from step S221 to step S224 of the memory 20 is similar to the process from step S211 to step S214 of the processor 10. In these steps, the activation suspension controller 24 compares the processor authentication information received from the activation suspension controller 14 and the processor authentication information generated by the processor authentication information generating unit 25 and stored in the authentication information memory 26 (step S221). When the two pieces of the processor authentication information match, the activation suspension controller 24 determines that the authentication of the processor 10 is successful (Yes in step S222), and resumes the normal operation (step S223). In other words, the access by the processor 10 is permitted and the data reading and the data writing by the processor 10 start.

On the other hand, when the two pieces of the processor authentication information do not match, the activation suspension controller 24 determines that the authentication of the processor 10 fails (No in step S222), and stops the operation (step S224). Thus, the authentication process completes.

In the foregoing, the present invention has been described with reference to the exemplary embodiment. There can be, however, various modifications or alterations to the embodiment as described above.

In the first embodiment, the authentication information generated in the processor 10 and the authentication information generated in the memory 20 are employed as the memory authentication information and the processor authentication information, respectively. In one modification of the first embodiment, however, the authentication information generated by the processor 10 and the memory 20 may be utilized as information for the processor 10 and the memory 20 to authenticate each other.

For example, the memory 20 may utilize the memory authentication information, i.e., the authentication information generated in the processor, to authenticate the processor 10. On the other hand, the processor 10 may utilize the processor authentication information, i.e., the authentication information generated in the memory, to authenticate the memory 20.

Still alternatively, the processor 10 may utilize both the processor authentication information and the memory authentication information to authenticate the memory 20. Similarly, the memory 20 may utilize both the processor authentication information and the memory authentication information to authenticate the processor 10.

Figure 4:
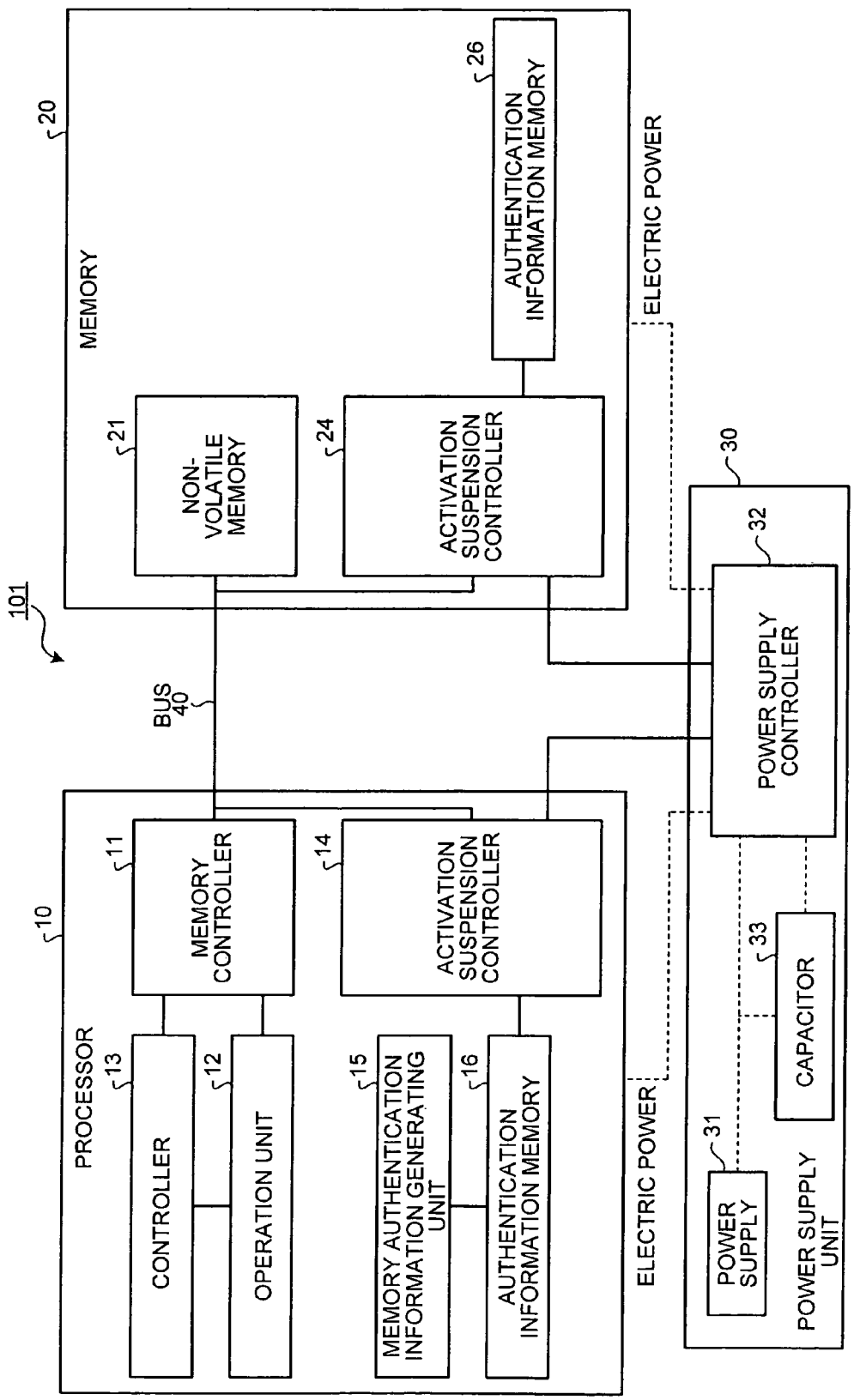
FIG. 4 is a diagram of an overall structure of a computer system in which only a processor generates authentication information.

Still alternatively, only one of the processor 10 and the memory 20 may generate the authentication information. FIG. 4 is a diagram of an overall structure of a computer system 101 in which only the processor 10 generates the authentication information.

In this case, the memory authentication information generated by the memory authentication information generating unit 15 of the processor 10 is stored in the authentication information memory 16. The activation suspension controller 24 of the memory 20 stores the memory authentication information acquired from the activation suspension controller 14 in the authentication information memory 26. At the beginning of the power supply, the processor 10 acquires the memory authentication information stored in the authentication information memory 26. On determining that the authentication is successful, the processor 10 starts the normal operation. Similarly, the memory 20 acquires the memory authentication information stored in the authentication information memory 16. On determining that the authentication is successful, the memory 20 starts the normal operation.

Still alternatively, only the memory 20 may generate the authentication information. In this case, the authentication between the memory 20 and the processor 10 is performed according to the authentication information generated by the memory 20. More specifically, the memory 20 authenticates the processor 10 utilizing the authentication information generated by the memory 20. The processor 10 authenticates the memory 20 utilizing the authentication information generated by the memory 20.

No matter whether both the processor 10 and the memory 20 generate the authentication information or only one of the processor 10 and the memory 20 generates the authentication information, the generated authentication information is sent to the counterpart device and shared by the processor 10 and the memory 20.

In a second modification, dissimilar to the first embodiment where the activation suspension controller 14 authenticates the memory connected to the processor 10 and the activation suspension controller 24 authenticates the processor connected to the memory 20, only one of the authentications may be performed.

For example, only the activation suspension controller 14 authenticates the memory 20. In this case, the activation suspension controller 14 compares the memory authentication information stored in the authentication information memory 16 and the memory authentication information stored in the authentication information memory 26, to authenticate the memory 20, and the memory 20 does not need to authenticate the processor 10. In other words, the activation suspension controller 24 may not compare the processor authentication information stored in the authentication information memory 26 and the processor authentication information stored in the authentication information memory 16. When the activation suspension controller 14 determines that the authentication is successful, not only the processor 10 but also the memory 20 starts the normal operation.

Still alternatively, only the activation suspension controller 24 may authenticate the processor 10. In this case, the activation suspension controller 24 compares the processor authentication information stored in the authentication information memory 26 and the processor authentication information stored in the authentication information memory 16 to authenticate the processor 10, and the processor 10 may not authenticate the memory 20. In other words, the activation suspension controller 14 may not compare the memory authentication information stored in the authentication information memory, 16 and the memory authentication information stored in the authentication information memory 26. When the activation suspension controller 24 determines that the authentication is successful, not only the memory 20 but also the processor 10 starts the normal operation.

In a third modification, dissimilar to the first embodiment where the activation suspension controllers 14 and 24 exchange the memory authentication information and the processor authentication information via the bus 40, the activation suspension controllers 14 and 24 may exchange information via a dedicated signal line.

In a fourth modification, dissimilar to the computer system 100 according to the first embodiment, where the processor authentication information and the memory authentication information are stored in the authentication information memory 26, the information may be stored in a part of the non-volatile memory that is a part of the memory.

In a fifth modification, dissimilar to the computer system 100 according to the first embodiment which includes only one processor, plural processors may be provided. In this case, the memory authentication information and the processor authentication information may be exchanged between each of the processors and the memory 20 to authenticate each other.

In a sixth modification, dissimilar to the computer system 100 according to the first embodiment which includes only one memory, plural memories may be provided. In this case, the processor 10 may exchange the memory authentication information and the processor authentication information with each of the plural memories to authenticate each other.

In a seventh modification, the computer system may include plural processors and plural memories. In this case, each of the plural processors exchanges the memory authentication information and the processor authentication information with each of the plural memories to authenticate the connected device.

Figure 5:
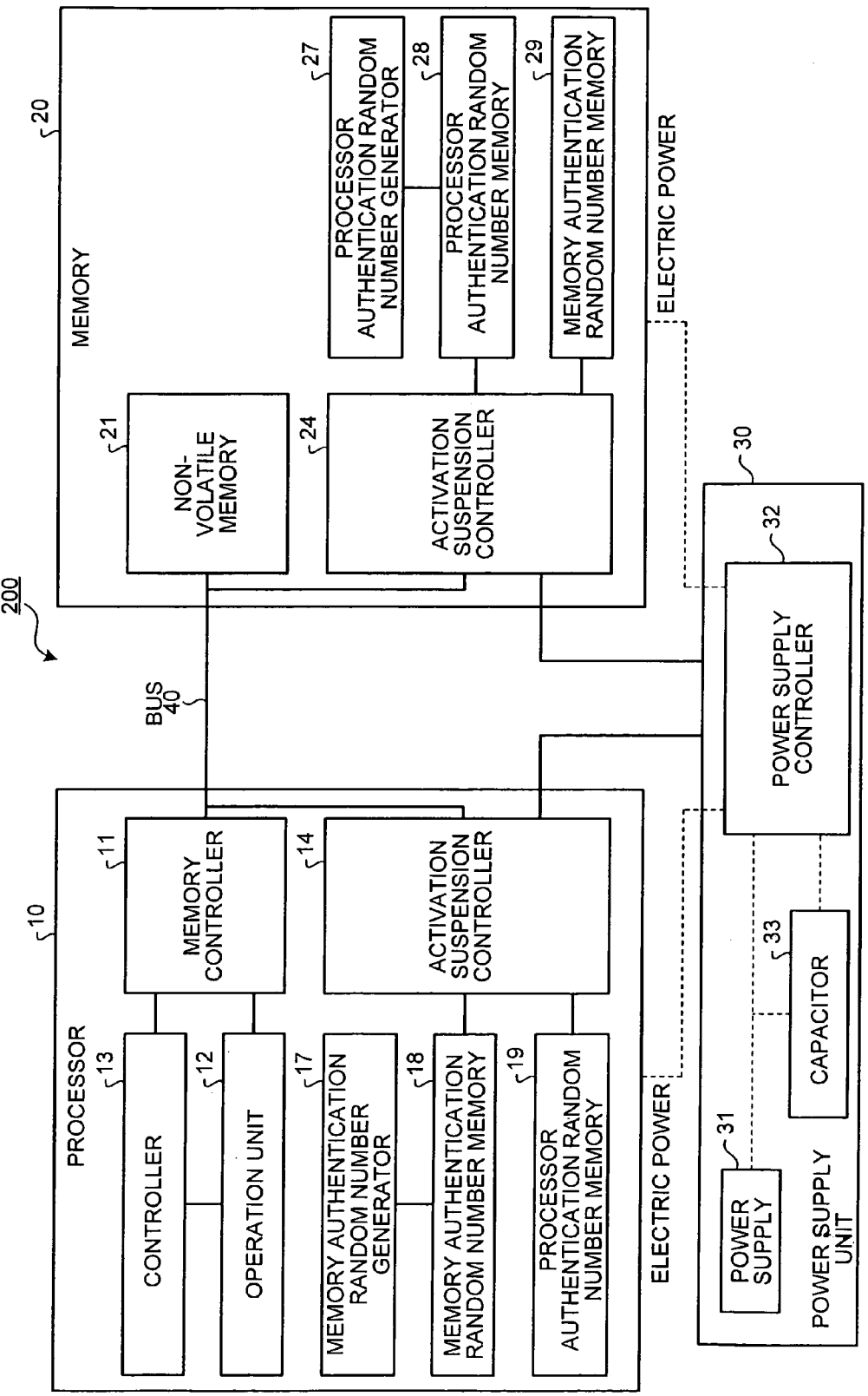
FIG. 5 is a diagram of an overall structure of a computer system according to a second embodiment.

FIG. 5 is a diagram of an overall structure of a computer system 200 according to a second embodiment. A processor 10 of the computer system 200 according to the second embodiment includes, in place of the memory authentication information generating unit 15 and the authentication information memory 16 of the processor 10 according to the first embodiment, a memory authentication random number generator 17, a memory authentication random number memory 18, and a processor authentication random number memory 19.

Further, a memory 20 of the computer system 200 according to the second embodiment includes, in place of the processor authentication information generating unit 25 and the authentication information memory 26 of the memory 20 according to the first embodiment, a processor authentication random number generator 27, a processor authentication random number memory 28, and a memory authentication random number memory 29.

The memory authentication random number generator 17 according to the second embodiment corresponds to the memory authentication information generating unit 15 according to the first embodiment. The memory authentication random number memory 18 and the processor authentication random number memory 19 according to the second embodiment correspond to the authentication information memory 16 according to the first embodiment. The processor authentication random number generator 27 according to the second embodiment corresponds to the processor authentication information generating unit 25 according to the first embodiment. The processor authentication random number memory 28 and the memory authentication random number memory 29 according to the second embodiment correspond to the authentication information memory 26 according to the first embodiment.

The memory authentication random number memory 18, the processor authentication random number memory 19, the processor authentication random number memory 28, and the memory authentication random number memory 29 are non-volatile memories. The non-volatile memories are employed for the prevention of data loss at the power shutoff.

The memory authentication random number generator 17 generates a random number. The random number generated by the memory authentication random number generator 17 will be referred to as a memory authentication random number. The memory authentication random number is stored in the memory authentication random number memory 18. Similarly, the processor authentication random number generator 27 generates a random number. The random number generated by the processor authentication random number generator 27 will be referred to as a processor authentication random number. The processor authentication random number is stored in the processor authentication random number memory 28.

The activation suspension controller 14 acquires the processor authentication random number generated by the processor authentication random number generator 27 from the activation suspension controller 24 to store the same in the processor authentication random number memory 19. The activation suspension controller 24 acquires the memory authentication random number generated by the memory authentication random number generator 17 from the activation suspension controller 14 to store the same in the memory authentication random number memory 29. In the second embodiment, the memory authentication random number and the processor authentication random number are utilized as the authentication information.

The memory authentication random number generated by the memory authentication random number generator 17 and the processor authentication random number generated by the processor authentication random number generator 27 are preferably of 40 bits or 128 bits in length (bit length), for example. The random number can be of any size as required. In view of security, larger size of the random number is preferable in general. However, when the random number is too large in size, time required for processing and communication may become excessive and the required amount of hardware for processing may become enormous. Hence, the size of the random number is preferably determined based on the security and the processing time. The size of the random number is not limited by the embodiment.

In the second embodiment, the memory authentication random number generator 17 and the processor authentication random number generator 27 are any conventionally known random number generators. In view of enhanced security of the system, random number is preferably generated based on a physical phenomenon in which generation system of the random numbers is difficult to estimate. The manner of random number generation is not limited by the embodiment.

Figure 6:
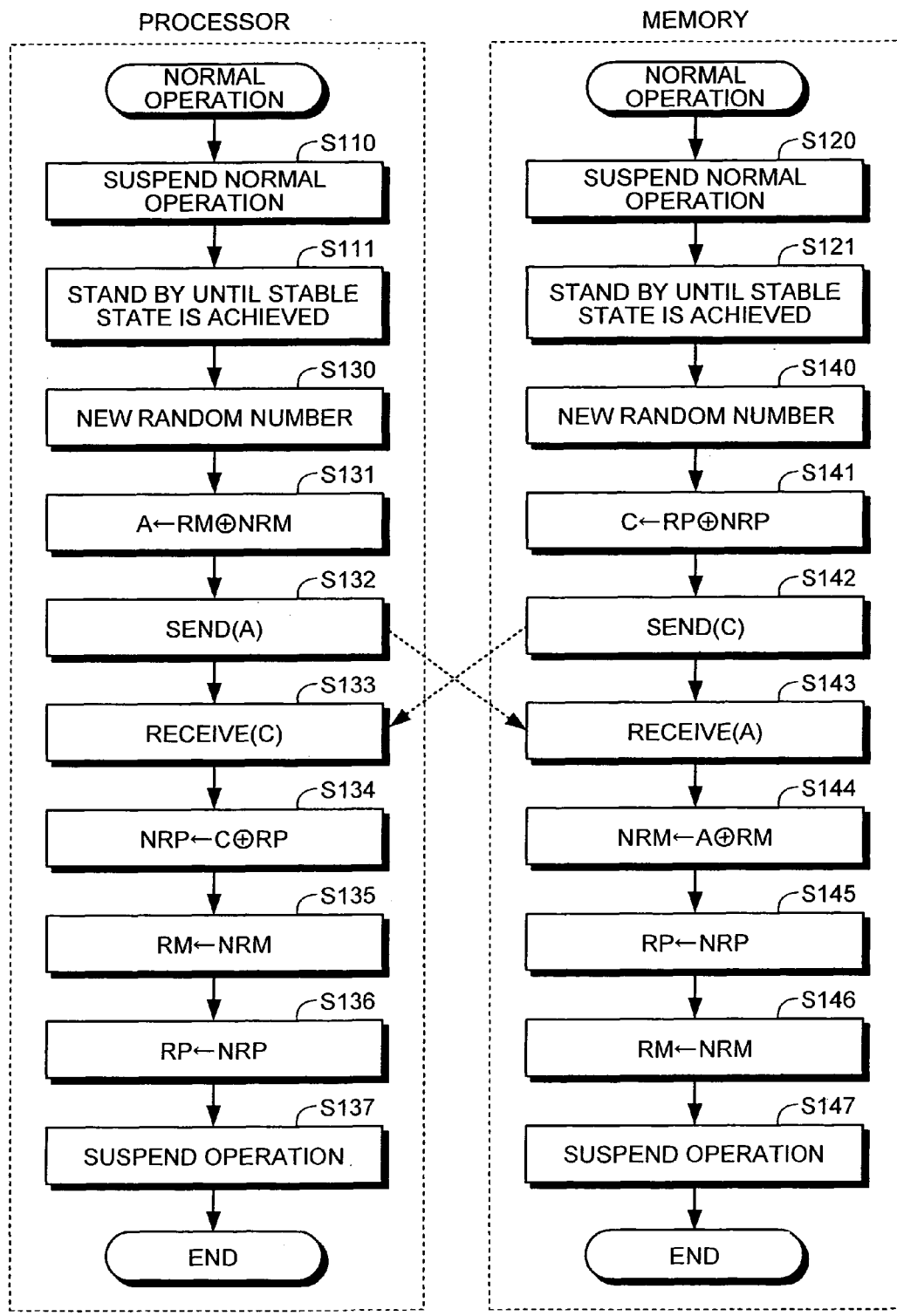
FIG. 6 is a flowchart of a suspension process which is executed when supply of electric power is cut off in the computer system according to the second embodiment.

FIG. 6 is a flowchart of the suspension process executed at the cutoff of the power supply in the computer system 200 according to the second embodiment. When the power supply controller 32 detects the cutoff of the power supply, the processor 10 and the memory 20 stand by until the stable state is achieved. The process here is similar to the process (step S110 to step S111, step S120 to step S121) as described above according to the first embodiment with reference to FIG. 2.

The process executed thereafter in the computer system 200 according to the second embodiment is different from the process in the computer system 100 according to the first embodiment. Here, the process performed after the realization of the stable state will be described.

When the stable state is achieved after the suspension of the normal operation by the processor 10 and the memory 20

(step S111), the activation suspension controller 14 makes the memory authentication random number generator 17 generate a new random number, i.e., a memory authentication random number (NRM) (step S130). Then, the activation suspension controller 14 finds an exclusive OR (A) of the newly generated memory authentication random number (NRM) and the memory authentication random number (RM) stored in the memory authentication random number memory 18 (step S131).

As a presupposition, it should be noted that the memory authentication random number memory 18 stores a memory authentication random number (RM) generated by the memory authentication random number generator 17 in the authentication process at the last start-up operation.

Then, the exclusive OR (A) is sent to the activation suspension controller 24 (step S132). Here, the exclusive OR of the NRM and the RM is found and sent for the prevention of observation from the outside. If the NRM is sent as it is, the NRM might be observed from the outside. Hence, the RM which is a secret number known only to the processor 10 and the memory 20 is employed as a shared encryption key, and the NRM is encrypted before transmission. The NRM, however, may be sent as it is.

In the second embodiment, the exclusive OR of the data whose encryption is desirable and the shared key is utilized. The manner of encryption, however, is not limited thereto and any manner of encryption can be employed.

On the other hand, once the stable state is achieved (step S121), the activation suspension controller 24 makes the processor authentication random number generator 27 generate a new random number, i.e., the processor authentication random number (NRP) (step S140). Then, the activation suspension controller 24 finds an exclusive OR (C) of the newly generated processor authentication random number (NRP) and the processor authentication random number (RP) stored in the processor authentication random number memory 28 (step S141). Then, the activation suspension controller 24 sends the exclusive OR (C) to the activation suspension controller 14 (step S142).

As a presupposition of step S141, it should be noted that the processor authentication random number memory 28 stores the processor authentication random number (RP) generated by the processor authentication random number generator 27 at the authentication process at the start-up of a previous operation.

On receiving the exclusive OR (C) (step S133), the processor 10 calculates an exclusive OR of the processor authentication random number (RP) stored in the processor authentication random number memory 19 and the exclusive OR (C), to acquire a new processor authentication random number (NRP) which is estimated to have been generated by the processor authentication random number generator 27 (step S134). Then, the processor 10 stores the acquired NRM as the RM in the memory authentication random number memory 18 (step S135). Further, the processor 10 stores the acquired NRP as the RP in the processor authentication random number memory 19 (step S136), and stops the operation (step S137).

On the other hand, on receiving the exclusive OR (A) (step S143), the memory 20 calculates an exclusive OR of the memory authentication random number (RM) stored in the memory authentication random number memory 29 and the exclusive OR (A), to acquire a new memory authentication random number (NRM) (step S144). Then the memory 20 stores the acquired NRP as the RP in the processor authentication random number memory 28 (step S145). Further, the memory 20 stores the acquired NRM as the RM in the memory authentication random number memory 29 (step S146), and stops the operation (step S147). Thus, the suspension process at the cutoff of the power supply completes.

Figure 7:
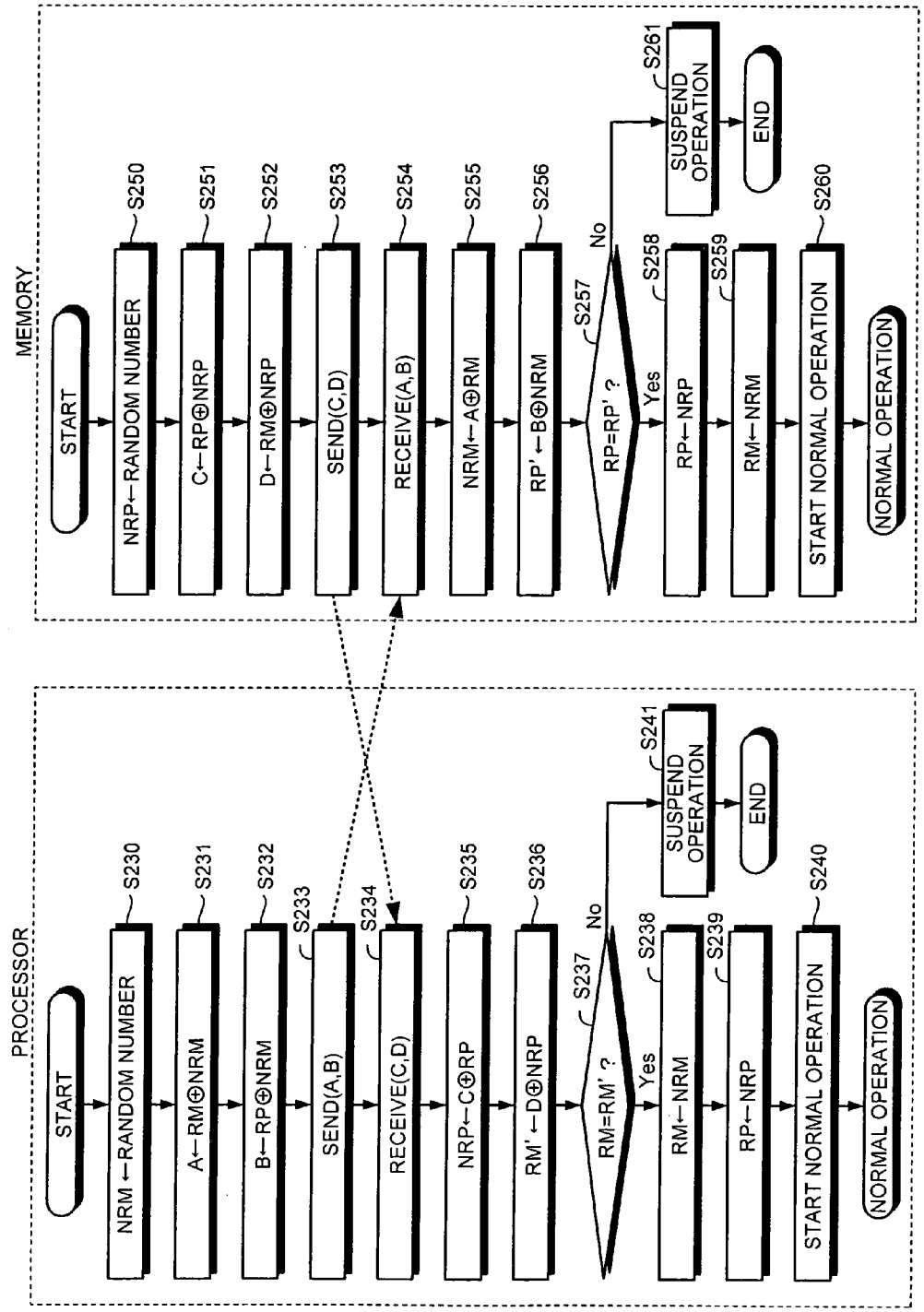
FIG. 7 is a flowchart of an authentication process which is executed when the supply of electric power resumes after the cutoff of the power supply in the computer system according to the second embodiment.

FIG. 7 is a flowchart of an authentication process. performed by the computer system 200 according to the second embodiment when the power supply is resumed after the cutoff of the power supply. Once the power supply starts, the activation suspension controller 14 of the processor 10 makes the memory authentication random number generator 17 generate a new memory authentication random number (NRM) (step S230). Then, the activation suspension controller 14 finds an exclusive OR (A) of the memory authentication random number (RM) stored in the memory authentication random number memory 18 and the memory authentication random number (NRM) newly generated by the memory authentication random number generator 17 (step S231).

Further, the processor 10 finds an exclusive OR (B) of the processor authentication random number (RP) stored in the processor authentication random number memory 19 and the memory authentication random number (NRM) newly generated by the memory authentication random number generator 17 (step S232). Then, the activation suspension controller 14 sends the generated exclusive OR (A) and the exclusive OR (B) to the activation suspension controller 24 (step 233).

The activation suspension controller 24 of the memory 20, similarly to the activation suspension controller 14, makes the processor authentication random number generator 27 generate a new processor authentication random number (NRP) (step S250). Then, the activation suspension controller 24 finds an exclusive OR (C) of the processor authentication random number (RP) stored in the processor authentication random number memory 28 and the processor authentication random number (NRP) newly generated by the processor authentication random number generator 27 (step S251), and further finds an exclusive OR (D) of the memory authentication random number (RM) stored in the memory authentication random number memory 29 and the processor authentication random number (NRP) newly generated by the processor authentication random number generator 27 (step S252). Then, the activation suspension controller 24 sends the generated exclusive OR (C) And the exclusive OR (D) to the activation suspension controller 14 (step S253).

Once acquiring the exclusive OR (C) and the exclusive OR (D) (step S234), the processor 10 finds an exclusive OR of the processor authentication random number (RP) stored in the processor authentication random number memory 19 and the acquired exclusive OR (C) to identify the processor authentication random number (NRP) generated in step S250 (step S235). Then, the processor 10 finds an exclusive OR (RM') of the identified processor authentication random number (NRP) and the acquired exclusive OR (D) (step S236).

Then, the processor 10 compares thus found exclusive OR (RM') and the memory authentication random number (RM) stored in the memory authentication random number memory 18. On finding that the exclusive OR (RM') and the memory authentication random number (RM) stored in the memory authentication random number memory 18 match with each other (Yes in step S237), the processor 10 determines that the counterpart the processor is connected to is the legitimate memory 20, and stores the NRM as the RM in the memory authentication random number memory 18 (step S238). Further, the processor 10 stores the NRP as the RP in the processor authentication random number memory 19 (step S239). Then, the processor 10 starts the normal operation (step S240).

When the processor 10 determines that the exclusive OR (RM') and the memory authentication random number (RM)

stored in the memory authentication random number memory 18 do not match with each other (No in step S237), the processor 10 stops the operation (step S241).

On the other hand, when the memory 20 acquires the exclusive OR (A) and the exclusive OR (B) (step S254), the memory 20 finds an exclusive OR of the memory authentication random number (RM) stored in the memory authentication random number memory 29 and the acquired exclusive OR (A), to identify the memory authentication random number (NRM) generated in step S230 (step S255). Then, the memory 20 finds an exclusive OR (RP') of the identified memory authentication random number (NRM) and the acquired exclusive OR (B) (step S256).

Then, the memory 20 compares thus found exclusive OR (RP') and the processor authentication random number (RP) stored in the processor authentication random number memory 28. On determining that the exclusive OR (RP') and the processor authentication random number (RP) stored in the processor authentication random number memory 28 match with each other (Yes in step S257), the memory 20 determines that the counterpart the memory 20 is connected to is the legitimate processor 10, and stores the NRP as the RP in the processor authentication random number memory 28 (step S258). Further, the memory 20 stores the NRM as the RM in the memory authentication random number memory 29 (step S259). Then, the memory 20 starts the normal operation (step S260).

On determining that the exclusive OR (RP') and the processor authentication random number (RP) stored in the processor authentication random number memory 28 do not match with each other (No in step S257) in step S257, the memory 20 stops the operation (step S261). Thus, the authentication process completes.

As can be seen from the foregoing, when the exclusive ORs utilized as the authentication information do not match with each other, the processor 10 and the memory 20 both stop the operation, whereby the illegal act can be prevented also in the second embodiment.

Alternatively, when the bus is employed to connect the processor and the memory, cycles for READ and WRITE (hereinafter respectively referred to as CREAD and CWRITE) dedicated for the exchange of the authentication information may be defined for the implementation of the above described processing in addition to the normal cycles used for reading and writing of the memory by the processor.

Figure 8:
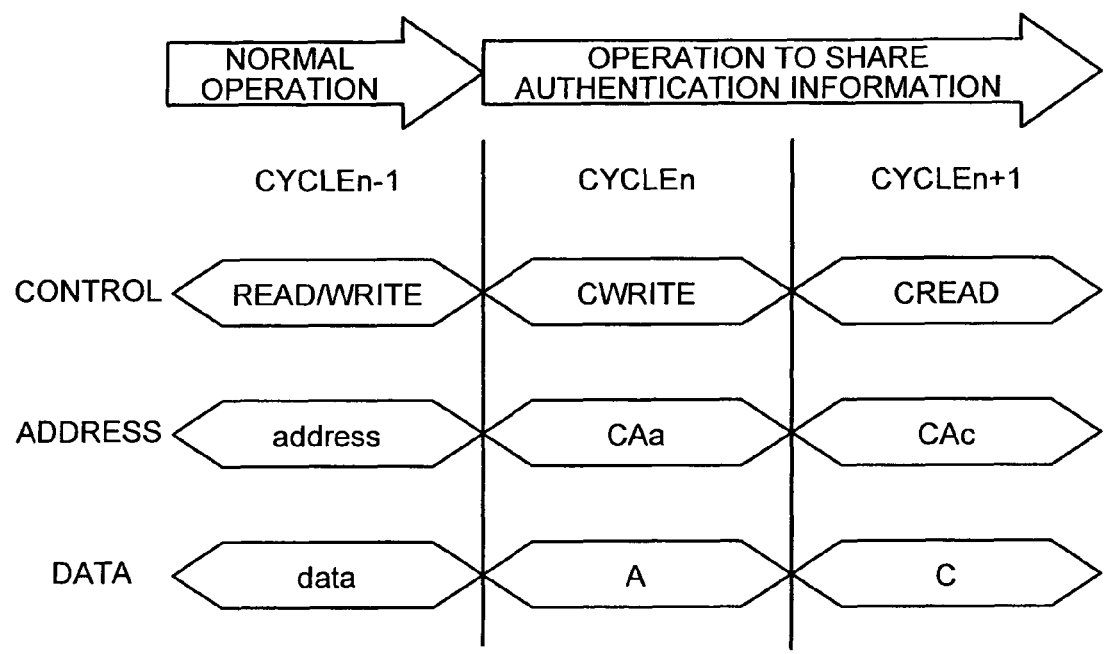
FIG. 8 is a diagram of a flow of an operation when a processor sends memory authentication information (A) to a memory, and the memory sends processor authentication information (C) to the processor.

FIG. 8 is a diagram of a flow of an operation performed by the processor 10 to send the memory authentication information (A) to the memory 20 and by the memory 20 to send the processor authentication information (C) to the processor 10. When such operation is performed, a signal indicating CWRITE is sent as the control signal on the bus. Further, a specific address CAa indicating that the information is the memory authentication information (A) is sent as the address signal, and the memory authentication information (A) is sent as the data signal.

Thereafter, the processor 10 reads out the processor authentication information (C) from the memory 20 via the CREAD operation. Then, a signal indicating CREAD is sent as the control signal on the bus. A specific address CAc indicating that the information is the processor authentication information (C) is sent as the address signal, and the processor authentication information (C) is sent as the data signal.

Here, it is preferable that some technique, for example, by provision of a special signal line for Joint Test Action Group (JTAG) test prevent the reading of the authentication information stored in the processor 10 or the memory 20 and the writing of the authentication information from the outside.

Figure 9:
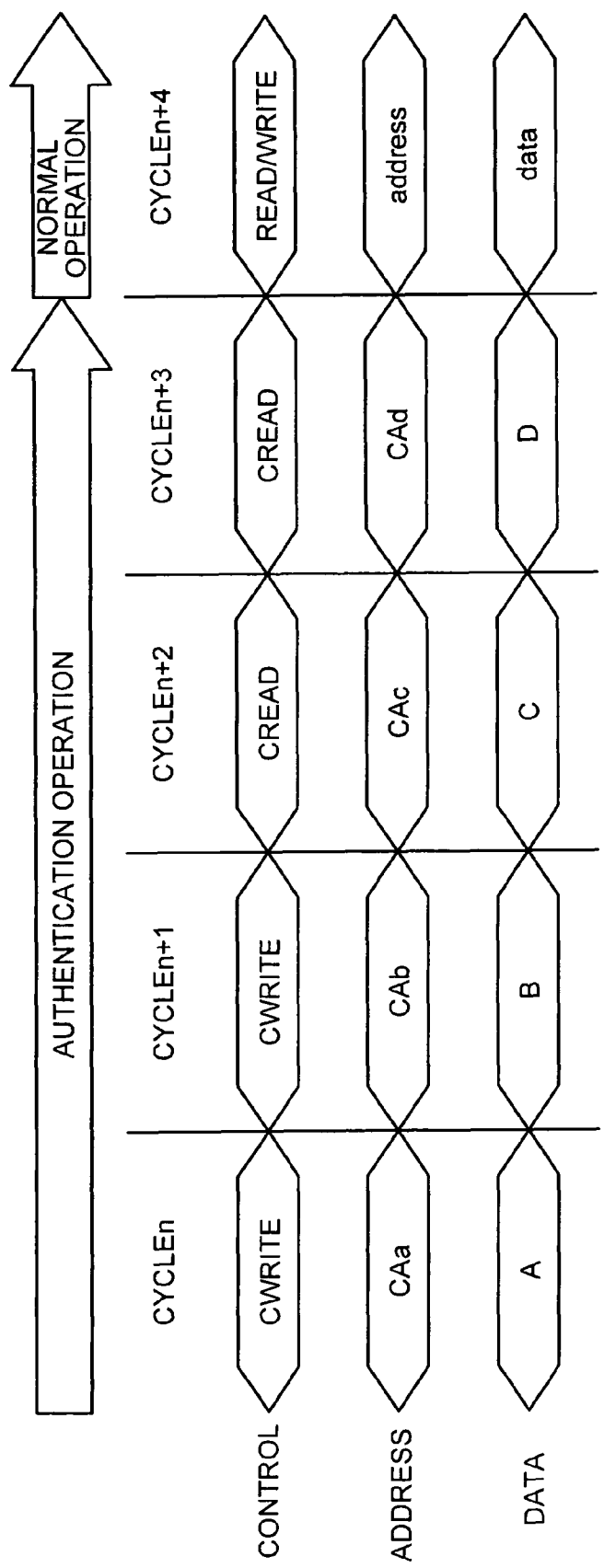
FIG. 9 is a diagram of a flow of an operation when random numbers or the like are exchanged.

FIG. 9 is a diagram of a flow of an operation of the exchange of the random numbers or the like. As shown in FIG. 9, when the processor 10 sends the exclusive OR (A) and the exclusive OR (B) to the memory 20 and the memory 20 sends the exclusive OR (C) and the exclusive OR (D) to the processor 10, the processor 10 first sends the exclusive OR (A) to the memory 20 by the CWRITE operation. On the bus, a signal indicating CWRITE is sent as the control signal, a specific address CAa indicating that it is the exclusive OR (A).is sent as the address signal, and the exclusive OR (A) is sent as the data signal.

Then, the processor 10 sends the exclusive OR (B) to the memory 20 by the CWRITE operation. On the bus, a signal indicating CWRITE is sent as the control signal, a specific address CAb indicating that it is the exclusive OR (B) is sent as the address signal, and the exclusive OR (B) is sent as the data signal.

Thereafter, the processor 10 reads out the exclusive OR (C) from the memory 20 by the CREAD operation. On the bus, a signal indicating CREAD is sent as the control signal, a specific address CAc indicating that it is the exclusive OR (C) is sent as the address signal, and the exclusive OR (C) is sent as the data signal.

Finally, the processor 10 reads out the exclusive OR (D) from the memory 20 by the CREAD operation. On the bus, a signal indicating CREAD is sent as the control signal, a specific address CAd indicating that it is the exclusive OR (D) is sent as the address. signal, and the exclusive OR (D) is sent as the data signal.

If not specified otherwise above, the structure and the process of the computer system 200 according to the second embodiment are the same as the structure and the process of the computer system 100 according to the first embodiment.

Figure 10:
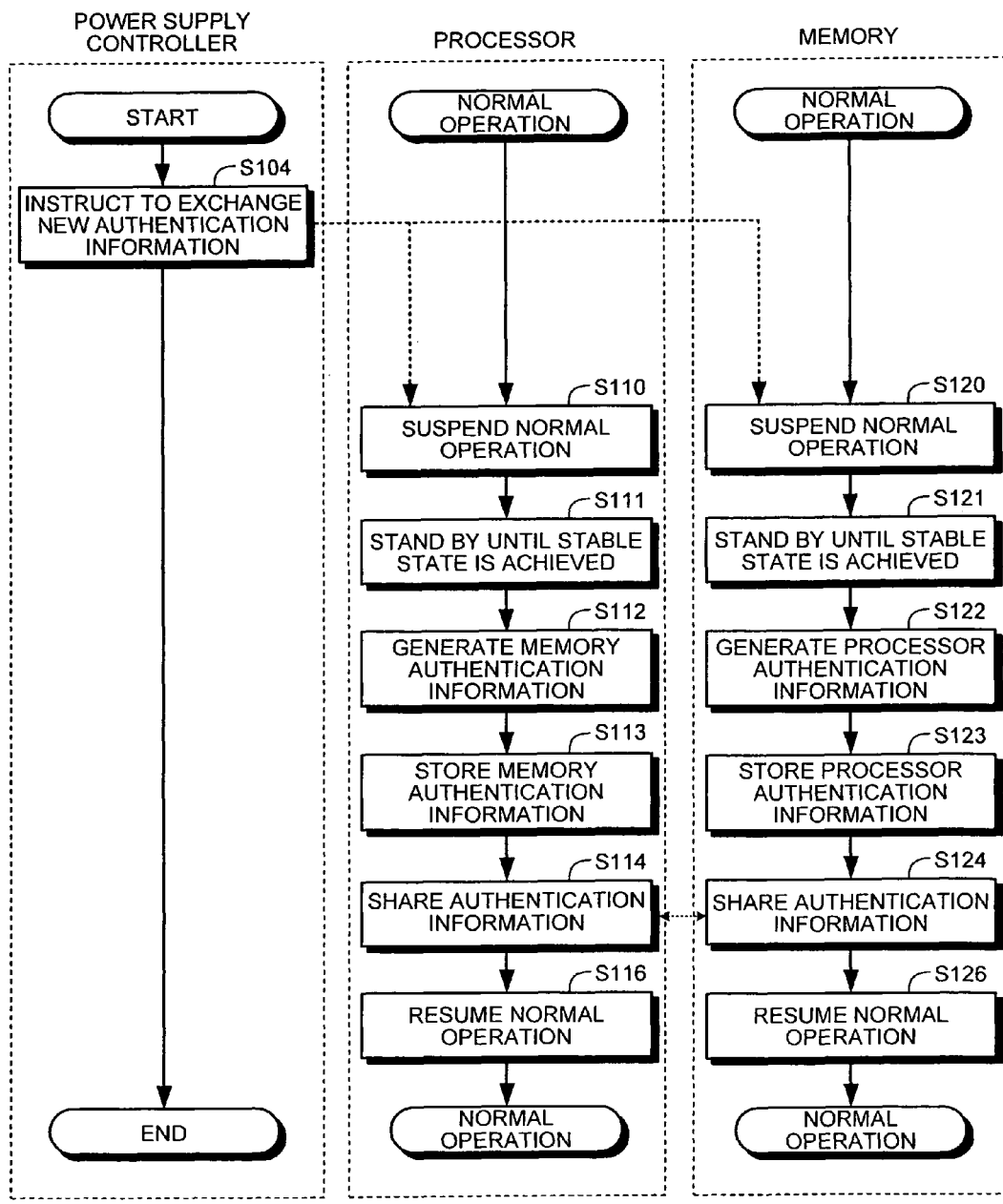
FIG. 10 is a flowchart of an authentication information generation process in a computer system according to a third embodiment.

FIG. 10 is a flowchart of the suspension process executed at the cutoff of the power supply in the computer system 200 according to the second embodiment. A computer system 300 according to a third embodiment will be described. An overall structure of the computer system 300 according to the third embodiment is the same as the overall structure of the computer system 100 according to the first embodiment described above with reference to FIG. 1.

The power supply controller 32 instructs the activation suspension controllers 14 and 15 to exchange new authentication information at a suitable timing (step S104). On receiving the instruction of the exchange of the new authentication information from the power supply controller 32, the activation suspension controller 14 stops the normal operation (step S110). Once the processor achieves the stable state (step S111), the activation suspension controller 14 generates the memory authentication information (step S112) and stores the same in the authentication information memory 16 (step 113).

Similarly, on receiving the instruction of the exchange of the new authentication information from the power supply controller 32, the activation suspension controller 24 stops the normal operation (step S120). Once the memory achieves the stable state (step S121), the activation suspension controller 24 generates the processor authentication information (step S122) and stores the same in the authentication information memory 26 (step S123).

Then, the activation suspension controller 14 stores the processor authentication information generated by the processor authentication information generating unit 25 in the authentication information memory 16 (step S114). Similarly, the activation suspension controller 24 stores the memory authentication information generated by the memory authentication information generating unit 15 in the authentication information memory 26 (step S124). Through the above described process, the processor 10 and the memory 20 share the processor authentication information and the memory authentication information.

The above described process is the same as the process from step S110 to step S114 by the processor 10 and the process from step S120 to step S124 by the memory 20 described with reference to FIG. 2 according to the first embodiment. Once the processor 10 and the memory 20 complete sharing of the authentication information, the processor 10 and the memory 20 each resume the normal operation (step S116, step S126). Thus, the authentication information generation process completes.

The power supply controller 32 may instruct the activation suspension controllers 14 and 24 at predetermined time intervals, for example, once every 10 seconds to exchange the new authentication information. Alternatively, the instruction may be given while the operation unit 12 is not performing any processing.

Still alternatively, though in the third embodiment the activation suspension controllers 14 and 24 perform the exchange of the authentication information according to the instruction from the power supply controller 32, the processor 10 may determine the timing of the exchange of the authentication information.

Figure 11:
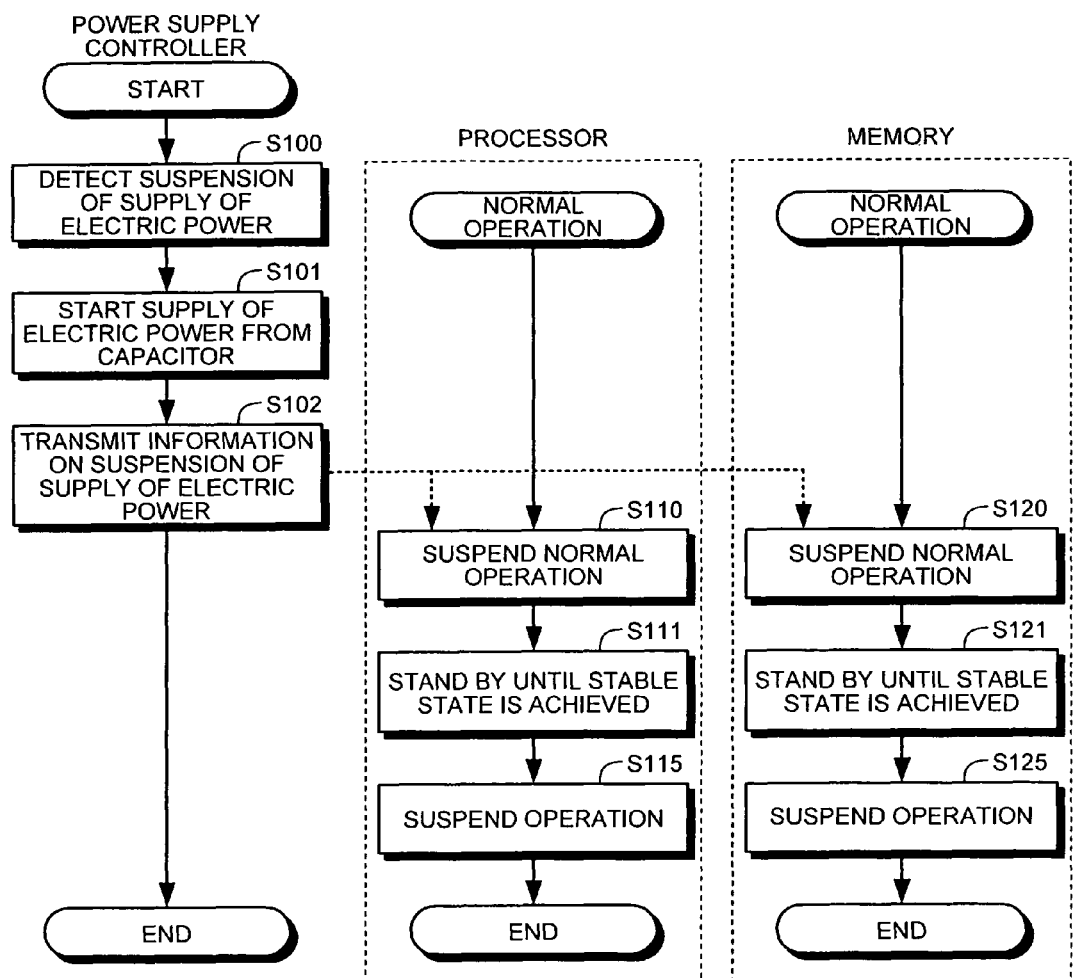
FIG. 11 is a flowchart of a suspension process which is executed when supply of electric power is cut off in the computer system according to the third embodiment.

FIG. 11 is a flowchart of the suspension process which is performed when the power supply stops in the computer system 300 according to the third embodiment. In the computer system 300 according to the third embodiment, the exchange of the processor authentication information and the memory authentication information is already completed during the normal operation. Hence, on receiving the instruction of the pre-suspension process from the power supply controller 32, the processor 10 and the memory 20 each stop the normal operation (step S110, step S120), and after achieving the stable state (step S111, step S121), stop the operation (step S115, step S125). Thus, the suspension process completes.

Thus in the computer system 300 according to the third embodiment, since the operation amount of pre-suspension process is small, the capacity of the capacitor 33 can be decreased.

Further, in the computer system 200 according to the second embodiment, similarly to the third embodiment, the exchange of the random numbers may be performed before the timing of the power supply cutoff.

If not specified otherwise above, the structure and the processing of the computer system 300 according to the third embodiment are the same as the structure and the processing of the computer system 100 according to the first embodiment.

Figure 12:
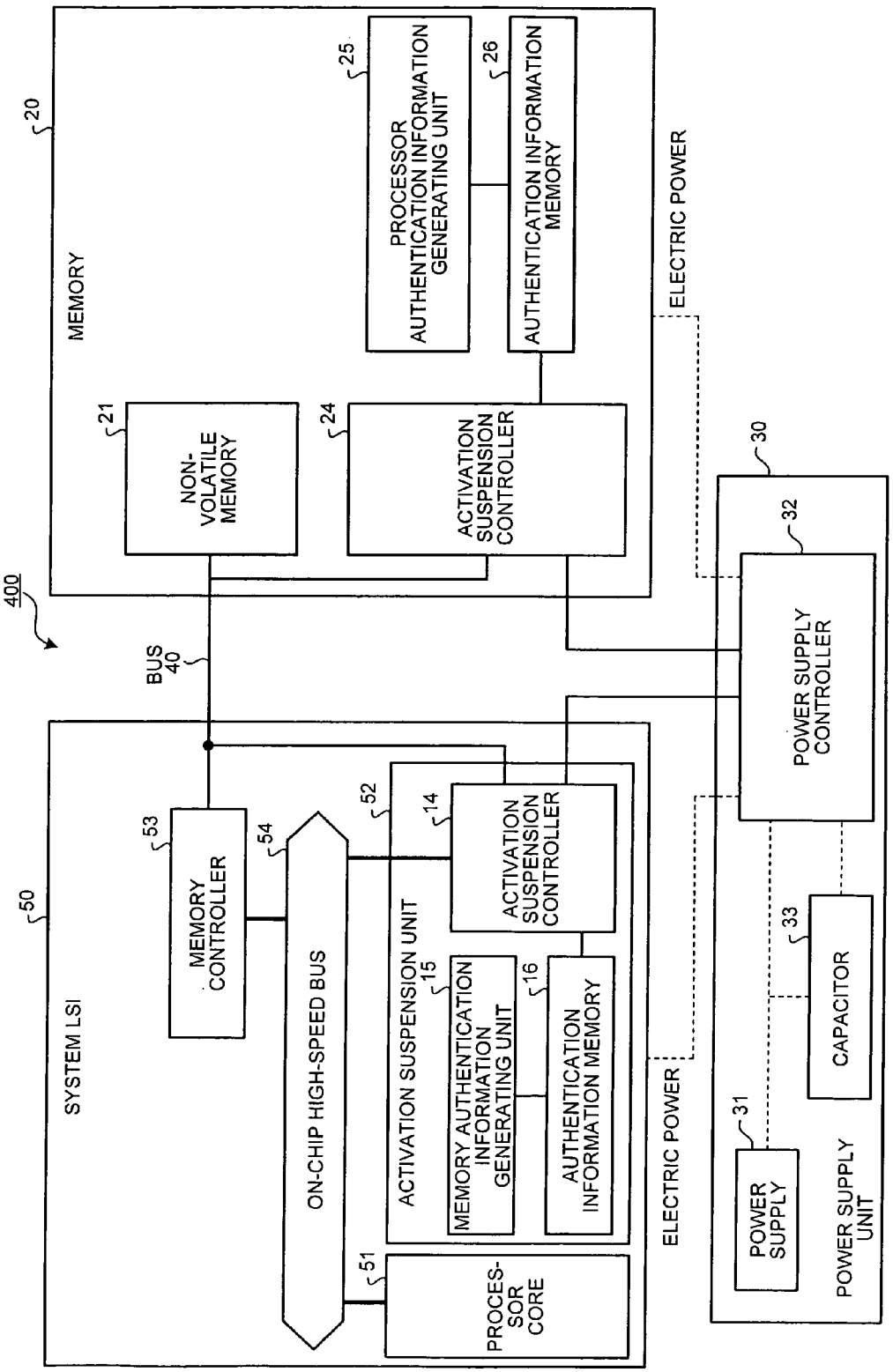
FIG. 12 is a diagram of an overall structure of a computer system according to a fourth embodiment.

FIG. 12 is a diagram of an overall structure of a computer system 400 according to a fourth embodiment. In the computer system 400 according to the fourth embodiment, a mechanism that realizes authentication between the processor and the memory is provided in a system LSI which incorporates a processor core.

Here, the system LSI is formed as one chip LSI in which a processor and peripheries that are conventionally fabricated on separate LSI chips are incorporated integrally. Conventionally, one or more LSI chips generally constitute a processor. However, the increasing integration of the LSI realizes the system LSI. The system LSI is also referred to as System on Chip (SoC), and a processor incorporated therein is referred to as a processor core.

As shown in FIG. 12, the computer system 400 includes a system LSI 50, the memory 20, and the power supply unit 30.

The system LSI 50 includes a processor core 51, an activation suspension unit 52, a memory controller 53, and an on-chip high-speed bus 54. Further the activation suspension unit 52 includes an activation suspension controller 14, a memory authentication information generating unit 15, and an authentication information memory 16.

Thus, the activation suspension controller 14, the memory authentication information generating unit 15, and the authentication information memory 16 are incorporated into the system LSI 50 as separate circuits independent from the processor core 51.

The processor core 51 includes a memory controller 11, an operation unit 12, and a controller 13. The processor core 51 is a circuit with an equivalent function to a normal processor. The processor core 51 is connected to other peripheral circuitries via the on-chip high-speed bus 54. The processor core 51 accesses the memory 20 connected to the system LSI 50 via the on-chip high-speed bus 54 and the memory controller 53, to read/write data or the like. The memory controller 53 performs a conversion between a transfer protocol of the on-chip high-speed bus 54 and a transfer protocol of the system LSI 50 that accesses the memory 20 outside.

The activation suspension controller 14 in the activation suspension unit 52 is connected to the on-chip high-speed bus 54. The activation suspension controller 14 is further connected to the power supply unit 30. The activation suspension unit 52 is also connected to the memory 20 via the activation suspension controller 14. Data exchange between the activation suspension controller 14 and the memory controller 53, and between the activation suspension controller 14 and the processor core 51 are realized through the on-chip high-speed bus 54.

Figure 13:
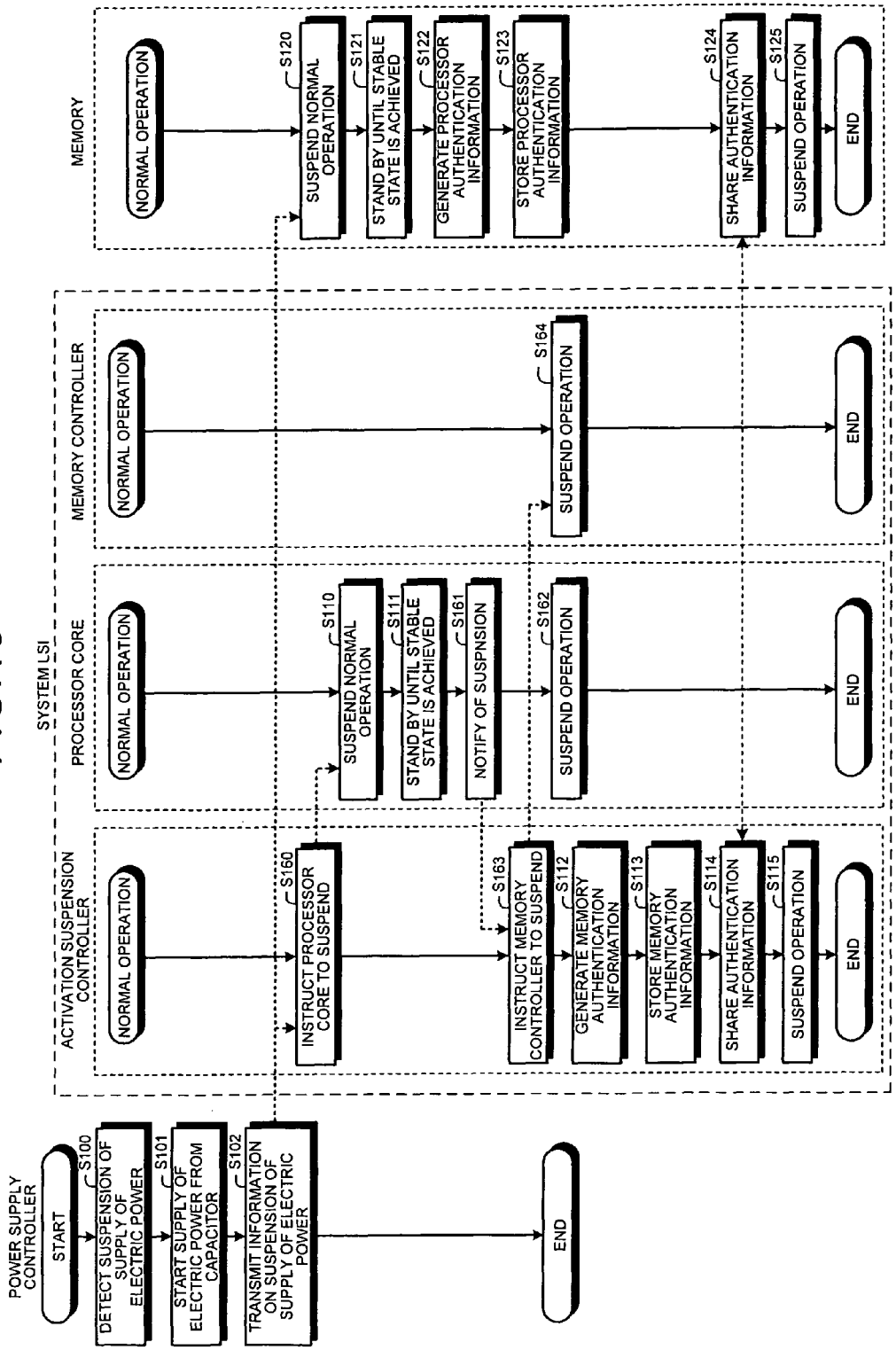
FIG. 13 is a flowchart of a suspension process which is executed when supply of electric power is cut off in the computer system according to the fourth embodiment.

FIG. 13 is a flowchart of the suspension process which is executed at the power supply cutoff in the computer system 400 according to the fourth embodiment. In the fourth embodiment, when the power supply from the capacitor 33 starts (step S101), the power supply controller 32 sends information on power supply suspension to the activation suspension controllers 14 and 24 of the activation suspension unit 52 (step S102).

On receiving the information on power supply suspension from the power supply controller 32, the activation suspension controller 14 instructs the processor core 51 to suspend the operation (step S160). More specifically, the activation suspension controller 14 sends an instruction to suspend the operation to the processor core 51 as an interrupt or the like.

On receiving the instruction of the suspension, the processor core 51 stops the normal operation which is currently underway (step S110). Then, the processor core 51 stands by until the stable state is achieved (step S111). Then, once the stable state is achieved, the processor core 51 notifies that the operation of the processor core 51 stops to the activation suspension unit 52 (step S161).

More specifically, the processor core 51 notifies the activation suspension controller 14 of the suspension of the operation by writing to a specific register, for example, of the activation suspension controller 14. Then, the processor core 51 stops the operation (step S162).

On receiving the notification of the suspension of the operation from the processor core 51 (step S161), the activation suspension controller 14 of the activation suspension unit 52 instructs the memory controller 53 to stop the operation (step S163). More specifically, the activation suspension controller 14 instructs the memory controller 53 to stop the operation by writing into a specific register of the memory controller 53, for example.

Then, the memory authentication information generating unit 15 of the activation suspension unit 52 newly generates the memory authentication information according to the instruction from the activation suspension controller 14 (step S112). Thereafter, the process from step S113 to step S115 is performed and the operation of the activation suspension unit 52 stops.

On receiving the instruction of the suspension from the activation suspension unit 52 (step S163), the memory controller 53 stops the operation (step S164). Thus, the suspension process completes. Other processes are the same as the processes described according to the first embodiment with reference to FIG. 2.

Since the processor core 51 stops its operation, if the system LSI does not include peripheral devices other than the processor core 51 that access the memory 20, the suspension of the operation of the memory controller 53 may not be necessary.

In the structure shown in FIG. 12, the activation suspension controllers 14 and 24 exchange the authentication information with each other via the bus 40. The exchange of the authentication information may be performed via the memory controller 53 by the activation suspension controller 14. In this case, the instruction of the suspension of the memory controller 53 by the activation suspension controller 14 (step S163) may be performed after the process of sharing the authentication information (step S114) in the flowchart of the suspension process shown in FIG. 13.

Figure 14:
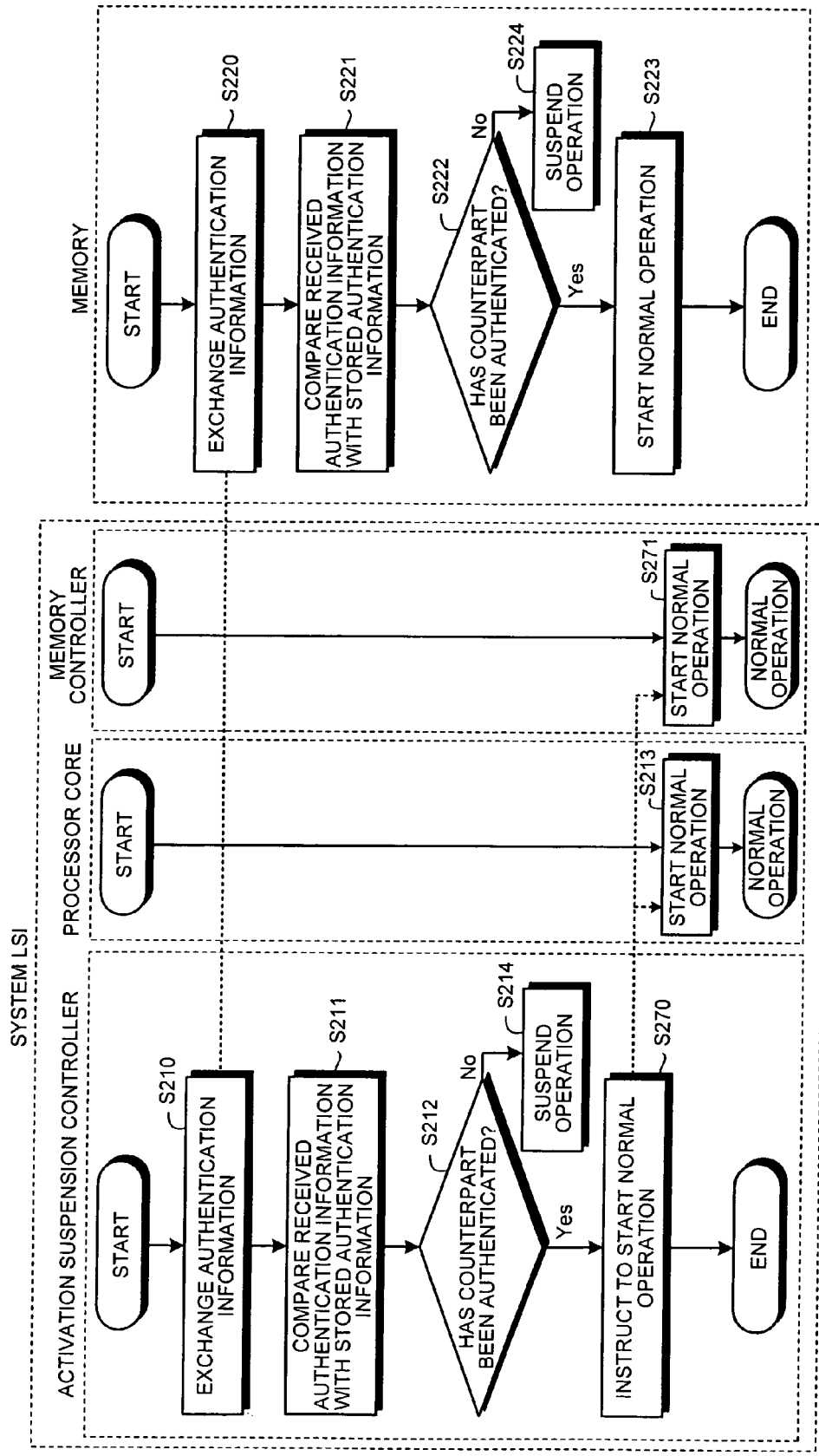
FIG. 14 is a flowchart of an authentication process which is executed when supply of electric power resumes after the cutoff of the power supply in the computer system according to the fourth embodiment.

FIG. 14 is a flowchart of the authentication process which is performed when the power supply is resumed after the power supply cutoff in the computer system 400 according to the fourth embodiment. In the fourth embodiment, the activation suspension controller 14 compares the memory authentication information received from the activation suspension controller 24 and the memory authentication information generated by the memory authentication information generating unit 15 and stored in the authentication information memory 16 (step S211). On determining that the two pieces of the memory authentication information match with each other, the activation suspension controller 14 determines that the authentication of the memory 20 is successful (Yes in step S212), and instructs the processor core 51 and the memory controller 53 to resume the normal operation (step S270).

More specifically, the activation suspension controller 14 may instruct to resume the normal operation by accessing a specific register in the memory controller 53. The activation suspension controller 14 instructs the processor core 51 by interrupt. Alternatively, the processor core 51 may perform poling of values of a specific register of the activation suspension controller 14 to acquire the instruction of resumption of the normal operation.

On receiving the instruction of the resumption of the normal operation (step S270), the processor core 51 starts the normal operation (step S213). On receiving the instruction of the resumption of the normal operation (step S270), the memory controller 53 starts the normal operation (step S271).

When the authentication fails in step S212 (No in step S212), the processor core 51 and the memory controller 53 do not start the operation.

Alternatively, the memory controller 53 may not start the normal operation and the processor core 51 may start the normal operation. Since the memory controller 53 stops, there is no access to the memory 20. Further, since the processor core 51 has a local memory described later, the processor core 51 can operate with the use of the local memory.

The processes other than described above are the same as the processes described according to the first embodiment with reference to FIG. 3.

Figure 15:
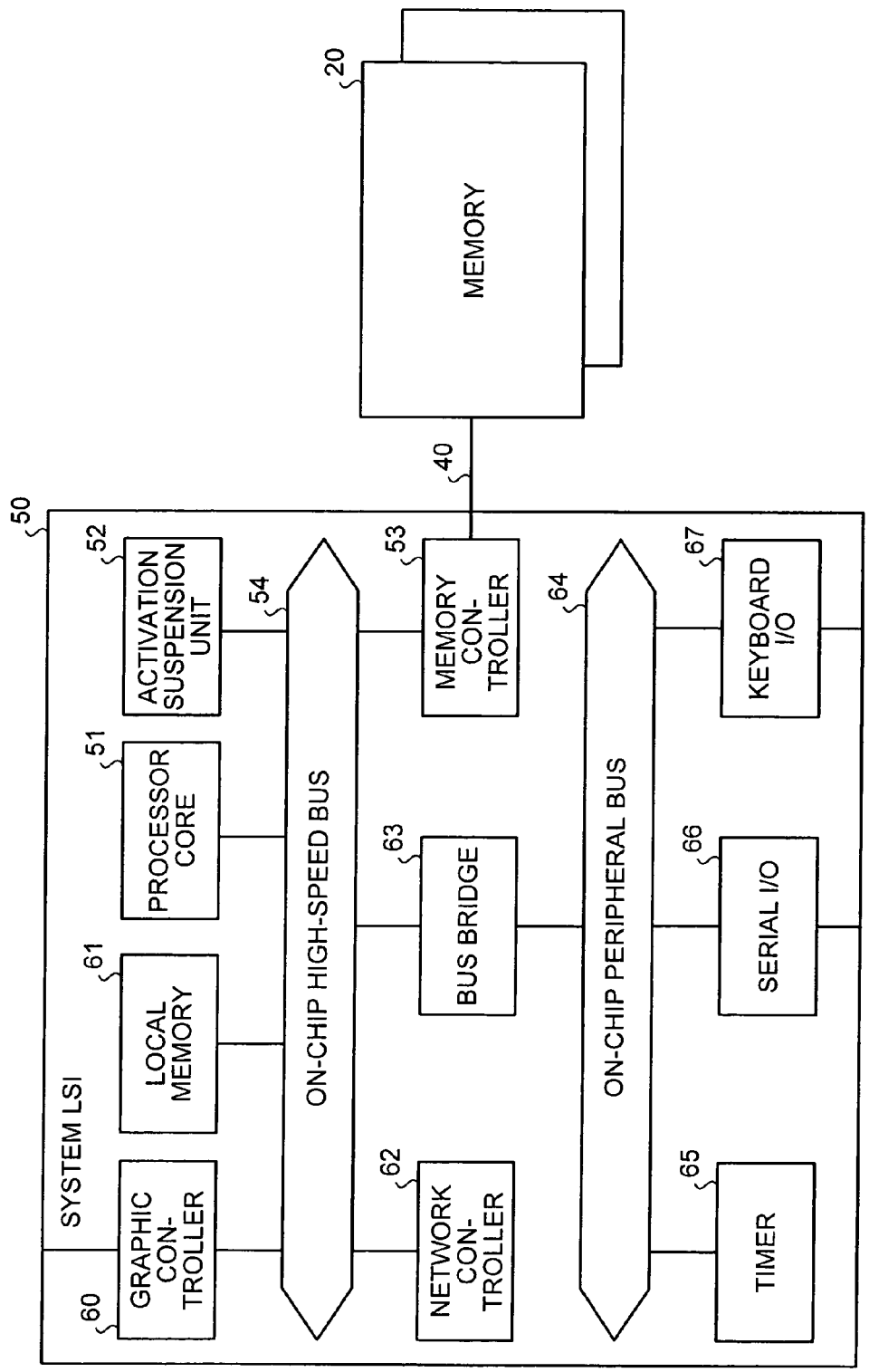
FIG. 15 is a more detailed diagram of a functional structure of a system LSI in the computer system according to the fourth embodiment.

FIG. 15 is a detailed diagram of a functional structure of the system LSI 50 of the computer system 400 according to the fourth embodiment. For example, the system LSI 50 shown in FIG. 15 includes a graphic controller 60, a local memory 61, and a network controller 62 in addition to the function described with reference to FIG. 12. The graphic controller 60 performs processing related with a display. The network controller 62 controls a network access.

When a peripheral circuitry (the graphic controller 60, for example) other than the processor core 51 in the system LSI 50 accesses the memory 20 outside, the access is performed via the memory controller 53.

The system LSI 50 has plural buses. The system LSI 50 according to the fourth embodiment includes an on-chip peripheral bus 64 that connects low-speed peripheral circuitries, such as a timer, a serial input/output (I/O), and a keyboard, in addition to the on-chip high-speed bus 54. The on-chip peripheral bus 64 is provided independent from the on-chip high-speed bus 54. The on-chip high-speed bus 54 and the on-chip peripheral bus 64 are connected by a bus bridge 63. Further, the on-chip peripheral bus 64 is connected to a timer 65, a serial I/O 66, and a keyboard I/O 67.

If not specified otherwise above, the structure and the process of the computer system 400 according to the fourth embodiment are the same as the structure and the process of the computer system 100 according to the first embodiment.

In a first modification of the computer system 400 according to the fourth embodiment, the system LSI 50 may include plural processor cores. Every processor core accesses the memory 20 outside via the memory controller 53.

Figure 16:
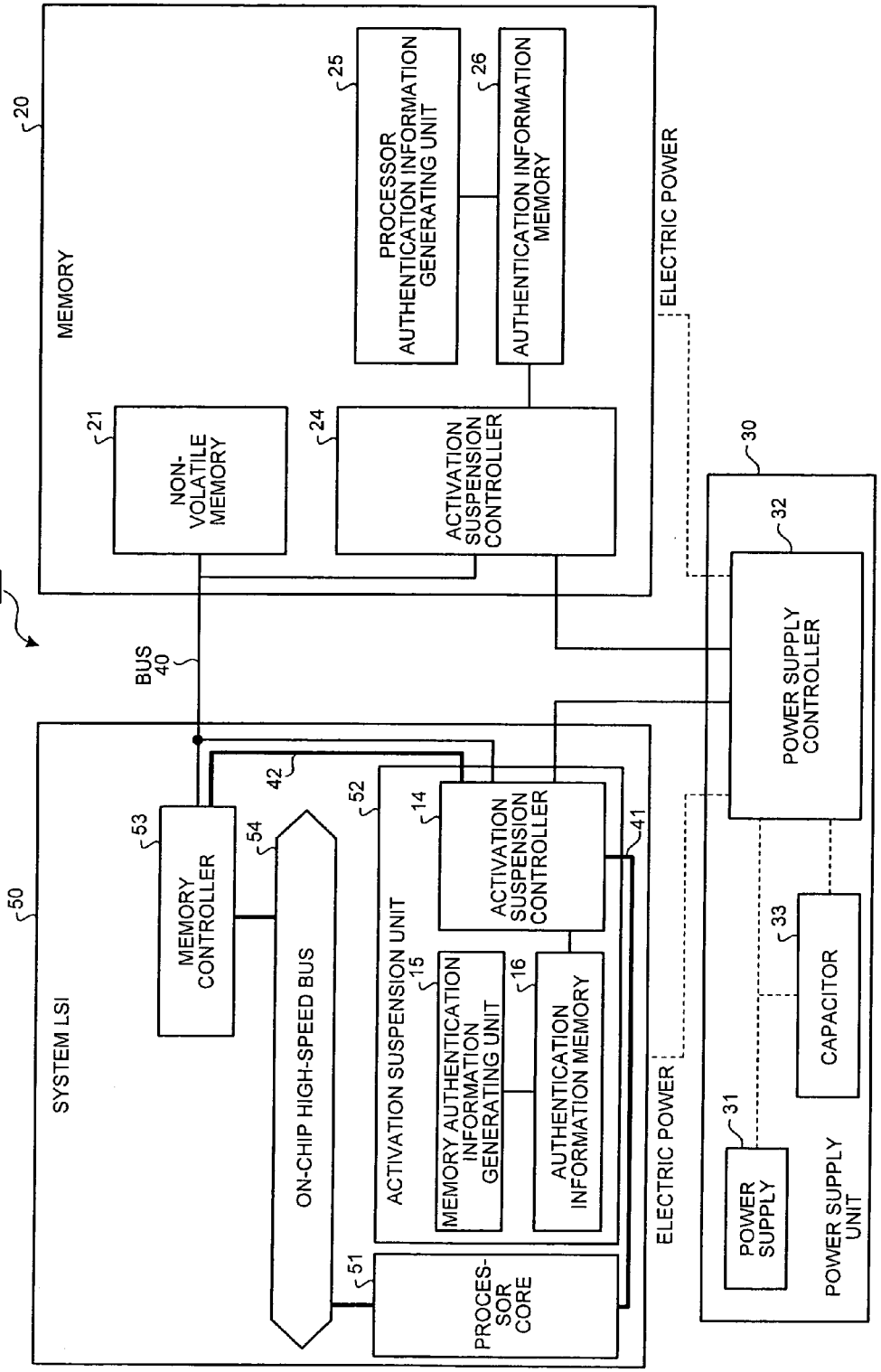
FIG. 16 is an explanatory diagram of a computer system according to a second modification of the computer system according to the fourth embodiment.

FIG. 16 is an explanatory diagram of a computer system 402 according to a second modification of the fourth embodiment. As shown in FIG. 16, in the computer system 402 according to the second modification, the activation suspension unit 52 is connected to the processor core 51 via a dedicated signal line 41. Further, the activation suspension unit 52 is connected to the memory controller 53 via a dedicated signal line 42. The activation suspension unit 52 exchanges data with the processor core 51 and the memory controller 53 via the dedicated signal lines 41 and 42, respectively.

Figure 17:
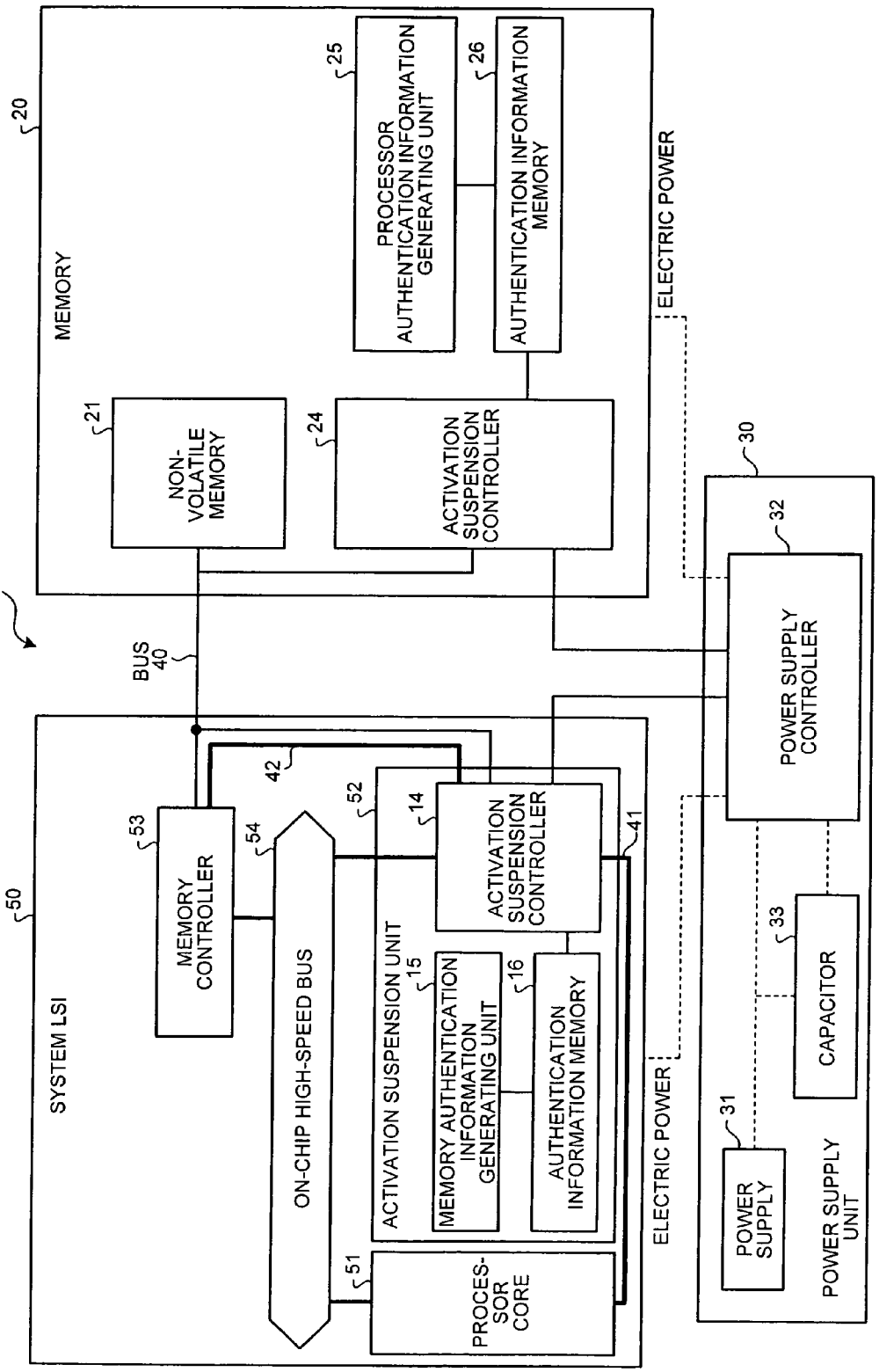
FIG. 17 is an explanatory diagram of a computer system according to a third modification of the computer system according to the fourth embodiment.

FIG. 17 is an explanatory diagram of a computer system 403 according to a third modification of the fourth embodiment. As shown in FIG. 17, in the computer system 403 according to the third modification, the activation suspension controller 14 may be connected to other peripheral circuitries via the on-chip high-speed bus 54, while the dedicated signal lines 41 and 42 may be provided between the activation suspension controller 14 and the processor core 51 and between the activation suspension controller 14 and the memory controller 53, respectively.

The activation suspension controller 14 may exchange data with the processor core 51 via the dedicated signal line 41 between the activation suspension controller 14 and the processor core 51, or via the on-chip high-speed bus 54. Further, the activation suspension controller 14 may exchange data with the memory controller 53 via the dedicated signal. line 42 between the activation suspension controller 14 and the memory controller 53, or via the on-chip high-speed bus 54.

The computer system 400 according to the fourth embodiment may generate the authentication information using the random number generator similarly to the computer system 200 according to the second embodiment. Alternatively, the computer system 400 according to the fourth embodiment may periodically exchange the authentication information during the normal operation instead of during the suspension of the power supply from the power supply 31, similarly to the computer system 300 according to the third embodiment. Thus, the processing of the computer systems in different embodiments may be combined.

Figure 18:
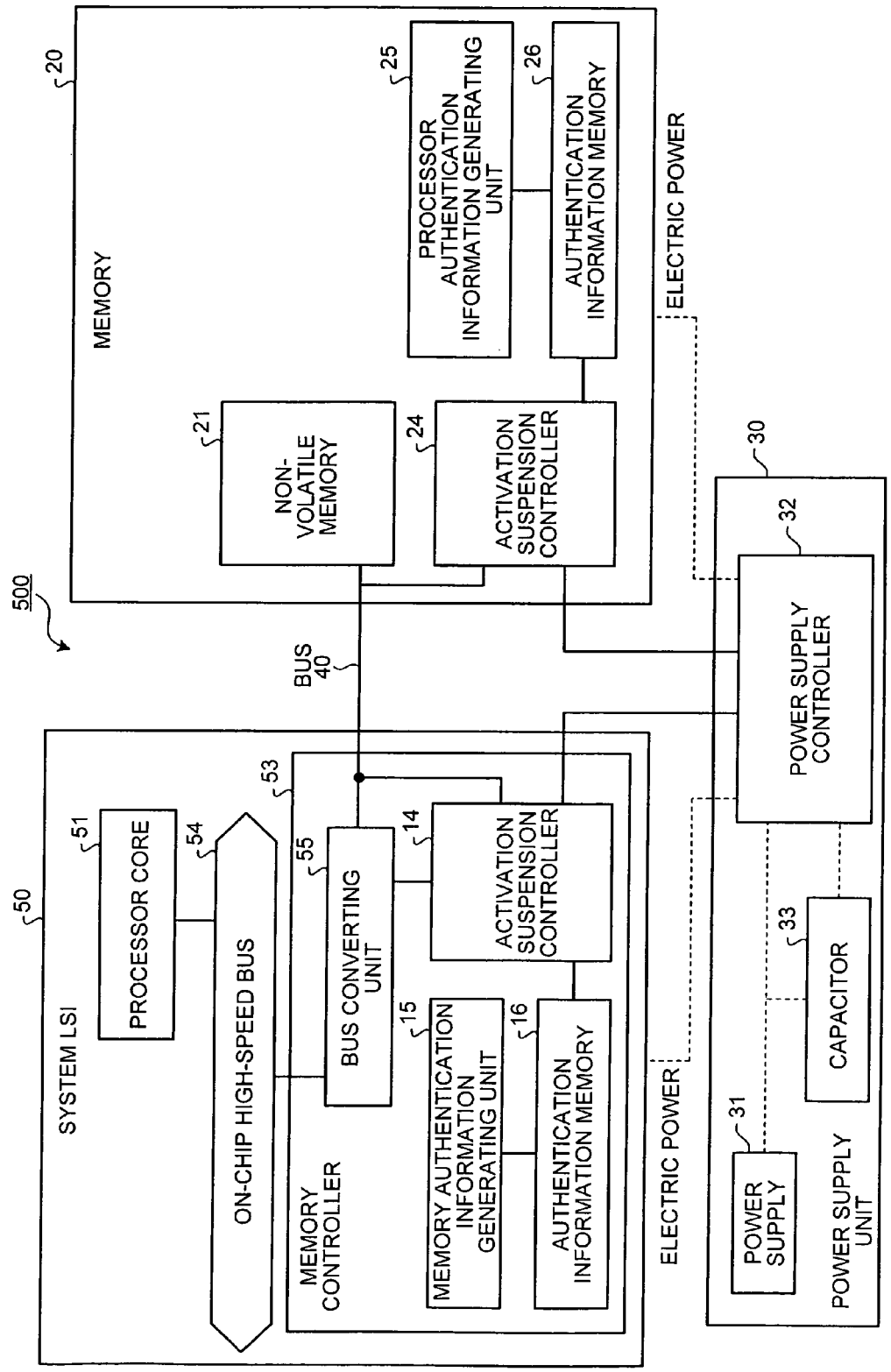
FIG. 18 is a diagram of an overall structure of a computer system according to a fifth embodiment.

FIG. 18 is a diagram of an overall structure of a computer system 500 according to a fifth embodiment. In the computer system 500 according to the fifth embodiment, a mechanism for authentication is incorporated into a memory controller in the system LSI.

As shown in FIG. 18, the system LSI 50 according to the fifth embodiment includes a processor core 51, a memory controller 53, and an on-chip high-speed bus 54. Further, the memory controller 53 includes an activation suspension controller 14, a memory authentication information generating unit 15, an authentication information memory 16, and a bus converting unit 55.

The activation suspension controller 14 is connected to the processor core 51 via the bus converting unit 55 and the on-chip high-speed bus 54. Thus, the mechanism for authentication may be incorporated into the memory controller 53.

If not specified otherwise above, the structure and the process of the computer system 500 according to the fifth embodiment are the same as the structure and the process of the computer system 400 according to the fourth embodiment.

Figure 19:
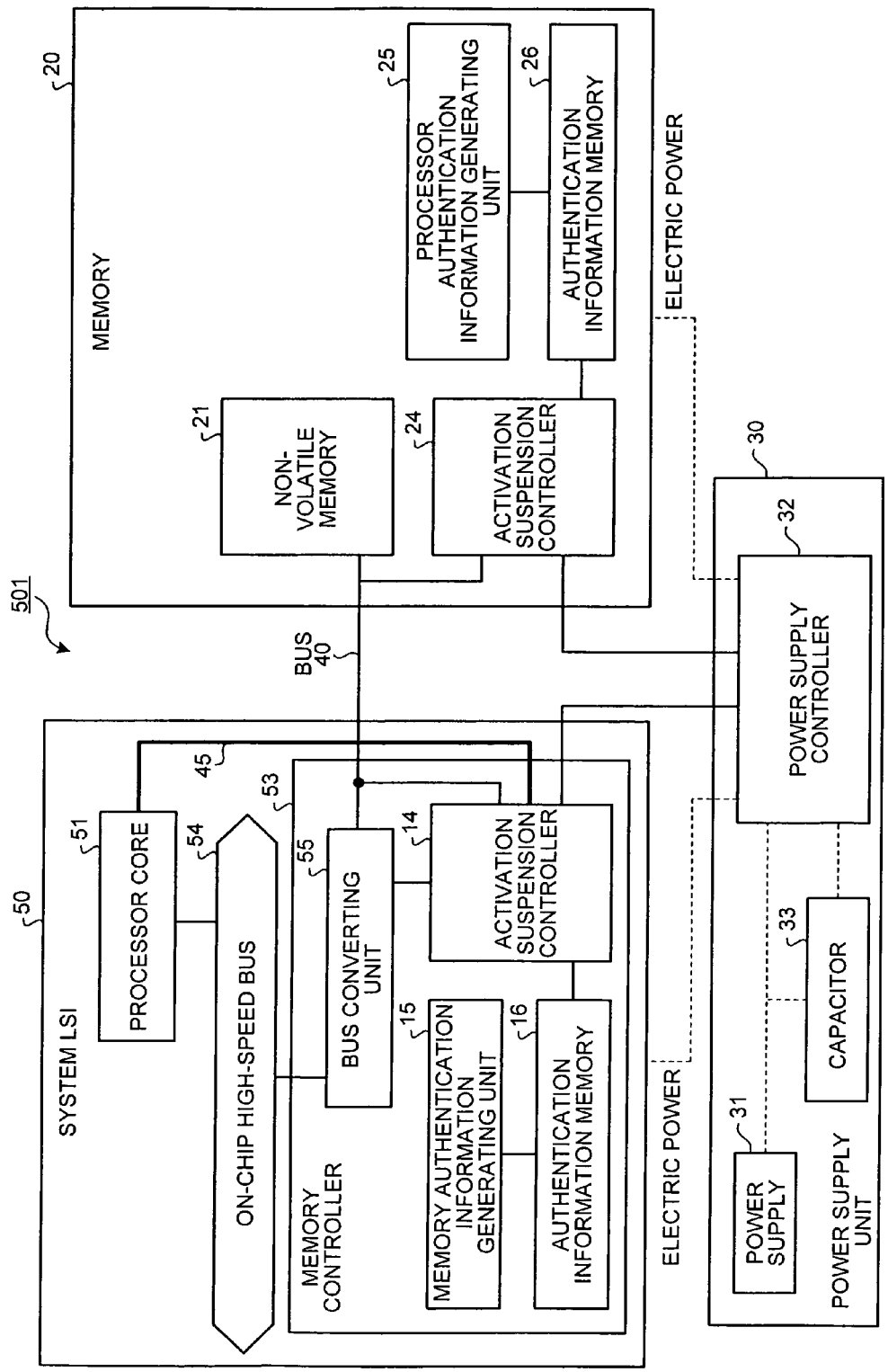
FIG. 19 is a diagram of an overall structure of a computer system according to a first modification of the fifth embodiment.

FIG. 19 is a diagram of an overall structure of a computer system 501 according to a first modification. The activation suspension controller 14 may be connected to the processor core 51 via a dedicated signal line 45 as shown in FIG. 19. Then, the processor core 51 exchanges data with the activation suspension controller 14 via the dedicated signal line 45.

In the fifth embodiment, the activation suspension controller 14 is connected to the on-chip high-speed bus 54 via the bus converting unit 55. In a second modification, however, the activation suspension controller 14 may be directly connected to the on-chip high-speed bus 54.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor for performing an operation utilizing information stored in a non-volatile memory, comprising:
a processing unit configured to perform the operation utilizing information stored in the non-volatile memory;
a first authentication memory formed integrally with the processing unit, and storing first memory authentication information for authentication of the non-volatile memory;
an authentication information acquiring section configured to acquire second memory authentication information from a second authentication memory formed integrally with the non-volatile memory;
a memory authenticating section configured to compare the first memory authentication information and the second memory authentication information to authenticate the non-volatile memory; and
a memory access controlling section configured to permit an access to the non-volatile memory when the memory authenticating section succeeds in authentication,
wherein the first authentication memory and the processing unit formed on a first device,
the second authentication memory and the non-volatile memory are formed on a second device,
the processor is formed separately from the second device, and
the processing unit executes at least the authentication information acquiring section and the memory authenticating section,
wherein the processor operates by electric power supplied from a power supply that supplies electric power to the processing unit and a capacitor that supplies electric power to the processing unit when the supply of electric power from the power supply to the processing unit stops, and
the processor further comprises
a power supply suspension detecting section configured to detect a timing of suspension of the supply of electric power from the power supply;
an authentication information generating section configured to generate the first memory authentication information after the timing of the suspension of the supply of electric power; and
a transferring section configured to transfer the first memory authentication information generated by the authentication information generating section to the second authentication memory before the timing of the suspension of the supply of electric power,
wherein the first authentication memory stores the first memory authentication information generated by the authentication information generating section.

2. The processor according to claim 1, further comprising a power supply start detecting section configured to detect start of supply of electric power from a power supply that supplies electric power to the processing unit,
wherein the authentication information acquiring section acquires the second memory authentication information when the power supply start detecting section detects the start of the supply of electric power.

3. A processor for performing an operation utilizing information stored in a non-volatile memory, comprising:
a processing unit configured to perform the operation utilizing information stored in the non-volatile memory;
a first authentication memory formed integrally with the processing unit, and storing first memory authentication information for authentication of the non-volatile memory;
an authentication information acquiring section configured to acquire second memory authentication information from a second authentication memory formed integrally with the non-volatile memory;
a memory authenticating section configured to compare the first memory authentication information and the second memory authentication information to authenticate the non-volatile memory; and
a memory access controlling section configured to permit an access to the non-volatile memory when the memory authenticating section succeeds in authentication,
wherein the first authentication memory and the processing unit formed on a first device,
the second authentication memory and the non-volatile memory are formed on a second device,
the processor is formed separately from the second device, and
the processing unit executes at least the authentication information acquiring section and the memory authenticating section, wherein the processor operates by electric power supplied from a power supply that supplies electric power to the processing unit and a capacitor that supplies electric power to the processing unit when the supply of electric power from the power supply to the processing unit stops, and the processor further comprises
a power supply suspension detecting section configured to detect a timing of the suspension of the supply of electric power from the power supply;
an authentication information generating section configured to generate the first memory authentication information after the timing of the suspension of the supply of electric power; and
a transferring section configured to transfer the first memory authentication information generated by the authentication information generating section to the second authentication memory after the timing of the suspension of the supply of electric power,
wherein the first authentication memory stores the first memory authentication information generated by the authentication information generating section.

4. The processor according to claim 1, wherein the authentication information generating section generates the first memory authentication information at predetermined time intervals.

5. The processor according to claim 1, wherein the authentication information generating section generates the first memory authentication information while the processing unit does not perform processing.

6. The processor according to claim 1, wherein the authentication information generating section is a random number generator.

7. A processor for performing an operation utilizing information stored in a non-volatile memory, comprising:
a processing unit configured to perform the operation utilizing information stored in the non-volatile memory;
a first authentication memory formed integrally with the processing unit, and storing first memory authentication information for authentication of the non-volatile memory;
an authentication information acquiring section configured to acquire second memory authentication information from a second authentication memory formed integrally with the non-volatile memory;
a memory authenticating section configured to compare the first memory authentication information and the second memory authentication information to authenticate the non-volatile memory; and
a memory access controlling section configured to permit an access to the non-volatile memory when the memory authenticating section succeeds in authentication,
wherein the first authentication memory and the processing unit formed on a first device,
the second authentication memory and the non-volatile memory are formed on a second device,
the processor is formed separately from the second device, and
the processing unit executes at least the authentication information acquiring section and the memory authenticating section,
wherein the processor operates by electric power supplied from a power supply that supplies electric power to the processing unit and a capacitor that supplies electric power to the processing unit when the supply of electric power from the power supply to the processing unit stops, and the processor further comprises
a power supply suspension detecting section configured to detect a timing of the suspension of the supply of electric power from the power supply,
wherein the first authentication memory stores the first memory authentication information acquired from the second authentication memory before the timing of the suspension of the supply of electric power.

8. A processor for performing an operation utilizing information stored in a non-volatile memory, comprising:
a processing unit configured to perform the operation utilizing information stored in the non-volatile memory;
a first authentication memory formed integrally with the processing unit, and storing first memory authentication information for authentication of the non-volatile memory;
an authentication information acquiring section configured to acquire second memory authentication information from a second authentication memory formed integrally with the non-volatile memory;
a memory authenticating section configured to compare the first memory authentication information and the second memory authentication information to authenticate the non-volatile memory; and
a memory access controlling section configured to permit an access to the non-volatile memory when the memory authenticating section succeeds in authentication,
wherein the first authentication memory and the processing unit formed on a first device,
the second authentication memory and the non-volatile memory are formed on a second device,
the processor is formed separately from the second device, and
the processing unit executes at least the authentication information acquiring section and the memory authenticating section,
wherein the processor operates by electric power supplied from a power supply that supplies electric power to the processing unit and a capacitor that supplies electric power to the processing unit when the supply of electric power from the power supply to the processing unit stops, and the processor further comprises
a power supply suspension detecting section configured to detect a timing of the suspension of the supply of electric power from the power supply,
wherein the first authentication memory stores the first memory authentication information acquired from the second authentication memory after the timing of the suspension of the supply of electric power.

9. The processor according to claim 1, wherein the authentication memory is a non-volatile memory.

10. A memory for storing information which is utilized by an operation, comprising:
a non-volatile memory storing information which is utilized by a first processing unit;
a first authentication memory formed integrally with the non-volatile memory, and storing first processor authentication information for authentication of the first processing unit;
an authentication information acquiring section configured to acquire second processor authentication information from a second authentication memory formed integrally with the first processing unit;
a processor authenticating section configured to compare the first processor authentication information and the second processor authentication information to authenticate the first processing unit;
a processor access controlling section configured to permit an access from the first processing unit when the processor authenticating section succeeds in authentication; and
a second processing unit configured to execute the authentication information acquiring section, the processor authenticating section and the processor access controlling section,
wherein the first authentication memory and the non-volatile memory are formed on a first device,
the second authentication memory and the first processing unit are formed on a second device, and
the memory is formed separately from the second device,
wherein the memory operates by electric power supplied from a power supply that supplies electric power to the non-volatile memory and a capacitor that supplies electric power to the non-volatile memory when the supply of electric power from the power supply to the non-volatile memory stops, and
the memory further comprises
a power supply suspension detecting section configured to detect a timing of suspension of the supply of electric power from the power supply,
an authentication information generating section configured to generate the first processor authentication information before the timing of the suspension of the supply of electric power, and
a transferring section that transfers the first processor authentication information generated by the authentication information generating section to the second authentication memory before the timing of the suspension of the supply of electric power,
wherein the first authentication memory stores the first processor authentication information generated by the authentication information generating section.

11. The memory according to claim 10, further comprising
a power supply start detecting section configured to detect start of supply of electric power from a power supply that supplies electric power to the non-volatile memory,
wherein the authentication information acquiring section acquires the second processor authentication information when the power supply start detecting section detects the start of the power supply.

12. A memory for storing information which is utilized by an operation, comprising:
a non-volatile memory storing information which is utilized by a first processing unit;
a first authentication memory formed integrally with the non-volatile memory, and storing first processor authentication information for authentication of the first processing unit;
an authentication information acquiring section configured to acquire second processor authentication information from a second authentication memory formed integrally with the first processing unit;
a processor authenticating section configured to compare the first processor authentication information and the second processor authentication information to authenticate the first processing unit;
a processor access controlling section configured to permit an access from the first processing unit when the processor authenticating section succeeds in authentication; and
a second processing unit configured to execute the authentication information acquiring section, the processor authenticating section and the processor access controlling section,
wherein the first authentication memory and the non-volatile memory are formed on a first device,
the second authentication memory and the first processing unit are formed on a second device, and
the memory is formed separately from the second device,
wherein the memory operates by electric power supplied from a power supply that supplies electric power to the non-volatile memory and a capacitor that supplies electric power to the non-volatile memory when the supply of electric power from the power supply to the non-volatile memory stops, and
the memory further comprises
a power supply suspension detecting section configured to detect a timing of suspension of the supply of electric power from the power supply,
an authentication information generating section configured to generate the first processor authentication information after the timing of the suspension of the supply of electric power, and
a transferring section configured to transfer the first processor authentication information generated by the authentication information generating section to the second authentication memory after the timing of the suspension of the supply of electric power,
wherein the first authentication memory stores the first processor authentication information generated by the authentication information generating section.

13. A memory for storing information which is utilized by an operation, comprising:
a non-volatile memory storing information which is utilized by a first processing unit;
a first authentication memory formed integrally with the non-volatile memory, and storing first processor authentication information for authentication of the first processing unit;
an authentication information acquiring section configured to acquire second processor authentication information from a second authentication memory formed integrally with the first processing unit;
a processor authenticating section configured to compare the first processor authentication information and the second processor authentication information to authenticate the first processing unit;
a processor access controlling section configured to permit an access from the first processing unit when the processor authenticating section succeeds in authentication; and
a second processing unit configured to execute the authentication information acquiring section, the processor authenticating section and the processor access controlling section,
wherein the first authentication memory and the non-volatile memory are formed on a first device,
the second authentication memory and the first processing unit are formed on a second device, and
the memory is formed separately from the second device,
wherein the memory operates by electric power supplied from a power supply that supplies electric power to the non-volatile memory and a capacitor that supplies electric power from the power supply to the non-volatile memory, and
the memory further comprises a power supply suspension detecting section configured to detect a timing of suspension of the supply of electric power from the power supply, wherein the first authentication memory stores the first processor authentication information acquired from the second authentication memory after the timing of the suspension of the supply of electric power.

14. A memory for storing information which is utilized by an operation, comprising:

a non-volatile memory storing information which is utilized by a first processing unit;

a first authentication memory formed integrally with the non-volatile memory, and storing first processor authentication information for authentication of the first processing unit;

an authentication information acquiring section configured to acquire second processor authentication information from a second authentication memory formed integrally with the first processing unit;

a processor authenticating section configured to compare the first processor authentication information and the second processor authentication information to authenticate the first processing unit;

a processor access controlling section configured to permit an access from the first processing unit when the processor authenticating section succeeds in authentication; and a second processing unit configured to execute the authentication information acquiring section, the processor authenticating section and the processor access controlling section, wherein the first authentication memory and the non-volatile memory are formed on a first device, the second authentication memory and the first processing unit are formed on a second device, and the memory is formed separately from the second device, wherein the memory operates by electric power supplied from a power supply that supplies electric power to the non-volatile memory and a capacitor that supplies electric power to the non-volatile memory when the supply of electric power from the power supply to the non-volatile memory stops, and the memory further comprises a power supply suspension detecting section configured to detect a timing of suspension of the supply of electric power from the power supply, wherein the first authentication memory stores the first processor authentication information acquired from the second authentication memory after the timing of the suspension of the supply of electric power.

15. The memory according to claim 10, wherein the authentication memory is a non-volatile memory.

16. A computer system comprising:

a processing unit;

a non-volatile memory storing information utilized by the processing unit;

a first authentication memory formed integrally with the non-volatile memory, and storing first authentication information for authentication between the processing unit and the non-volatile memory;

a second authentication memory formed integrally with the processing unit, and storing second authentication information;

an authenticating section configured to compare the first authentication information and the second authentication information to perform authentication between the processing unit and the non-volatile memory; and an access controlling section configured to permit an access between the non-volatile memory and the processing unit when the authenticating section succeeds in authentication, wherein the first authentication memory and the non-volatile memory are formed as a first device in a memory, the second authentication memory and the processing unit are formed as a second device in a processor, the processor and the memory are formed separately from each other, and the processor executes the authenticating section and the access controlling section, wherein the processor operates by electric power supplied from a power supply that supplies electric power to the processing unit and a capacitor that supplies electric power to the processing unit when the supply of electric power from the power supply to the processing unit stops, and the processor further comprises a power supply suspension detecting section configured to detect a timing of suspension of the supply of electric power from the power supply;

an authentication information generating section configured to generate the second authentication information after the timing of the suspension of the supply of electric power; and a transferring section configured to transfer the second authentication information generated by the authentication information generating section to the first authentication memory before the timing of the suspension of the supply of electric power, wherein the second authentication memory stores the second authentication information generated by the authentication information generating section.

17. A method of authentication in a computer system including a processing unit, the method comprising:

performing authentication between the processing unit and a non-volatile memory, by comparing first authentication information stored in a first authentication memory that is formed integrally with the non-volatile memory that stores information utilized by the processing unit, and stores the second authentication information for authentication between the processing unit and the non-volatile memory, and second authentication information stored in a second authentication information memory that is formed integrally with the processing unit, and stores the second authentication information; and controlling an access so as to permit an access between the non-volatile memory and the processing unit when the authentication is successful in the step of performing authentication, wherein the first authentication memory and the non-volatile memory are formed as a first device in a memory, the second authentication memory and the processing unit are formed as a second device in a processor, and the processor and the memory are formed separately from each other, wherein the processor operates by electric power supplied from a power supply that supplies electric power to the processing unit and a capacitor that supplies electric power to the processing unit when the supply of electric power from the power supply to the processing unit stops, the method further comprising detecting, by a power supply suspension detecting section, a timing of suspension of the supply of electric power from the power supply;

generating, by an authentication information generating section, the second authentication information after the timing of the suspension of the supply of electric power; and transferring, by a transferring section, the second authentication information generated by the authentication information generating section to the first authentication memory before the timing of the suspension of the supply of electric power, wherein the second authentication memory stores the second authentication information generated by the authentication information generating section.

18. A system large scale integrated circuit comprising:

a processor core configured to perform an operation utilizing information stored in a non-volatile memory;

a first authentication memory formed integrally with the processor core, and storing first memory authentication information for authentication of the non-volatile memory;

a second authentication memory formed integrally with the non-volatile memory, and storing second memory authentication information for authentication of the non-volatile memory;

an authentication information acquiring section configured to acquire the second authentication information;

a memory authenticating section configured to compare the second authentication information acquired by the authentication information acquiring section and the first memory authentication information; and a memory access controlling section configured to permit an access to the non-volatile memory when the memory authenticating section succeeds in authentication, wherein the first authentication memory and the processor core are formed as a first device in a processor, the second authentication memory and the non-volatile memory are formed as a second device in a memory, and the processor and the memory are formed separately from each other, wherein the processor operates by electric power supplied from a power supply that supplies electric power to the processor core and a capacitor that supplies electric power to the processor core when the supply of electric power from the power supply to the processor core stops, and the processor further comprises a power supply suspension detecting section configured to detect a timing of suspension of the supply of electric power from the power supply;

an authentication information generating section configured to generate the first memory authentication information after the timing of the suspension of the supply of electric power; and a transferring section configured to transfer the first memory authentication information generated by the authentication information generating section to the second authentication memory before the timing of the suspension of the supply of electric power, wherein the first authentication memory stores the first memory authentication information generated by the authentication information generating section.

19. The system large scale integrated circuit according to claim 18, further comprising a memory controller that controls the non-volatile memory, wherein the controller includes the first authentication memory, the memory authentication information acquiring section, the memory authenticating section, and the memory access controlling section.

20. A computer system comprising a system large scale integrated circuit, and a memory that stores information utilized in the system large scale integrated circuit, the memory including a non-volatile memory configured to store information utilized by the processor core, and a first authentication memory integrally formed with the non-volatile memory, and storing first authentication information utilized for authentication of the non-volatile memory, and the system large scale integrated circuit including a processor core configured to perform an operation utilizing the information stored in the non-volatile memory, a second authentication memory formed integrally with the processor core, and storing second authentication information for authentication of the non-volatile memory, an authentication information acquiring section configured to acquire the first authentication information stored by the first authentication memory, a memory authenticating section configured to compare the first authentication information acquired by the authentication information acquiring section and the second authentication information to authenticate the non-volatile memory, and a memory access controlling section which permits an access to the non-volatile memory when the memory authenticating section succeeds in authentication of the non-volatile memory, wherein the first authentication memory and the non-volatile memory are formed on a first device, the second authentication memory and the processor core are formed on a second device, the system large scale integrated circuit and the memory are formed separately from each other, and the processor core executes the authentication information acquiring section and the memory authenticating section, wherein the processor operates by electric power supplied from a power supply that supplies electric power to the processor core and a capacitor that supplies electric power to the processor core when the supply of electric power from the power supply to the processor core stops, and the processor further comprises a power supply suspension detecting section configured to detect a timing of suspension of the supply of electric power from the power supply;

an authentication information generating section configured to generate the second authentication information after the timing of the suspension of the supply of electric power; and a transferring section configured to transfer the second authentication information generated by the authentication information generating section to the first authentication memory before the timing of the suspension of the supply of electric power, wherein the second authentication memory stores the second authentication information generated by the authentication information generating section.

21. A computer system comprising a system large scale integrated circuit and a memory that stores information utilized in the system large scale integrated circuit, the system large scale integrated circuit including a processor core configured to perform an operation, and a first authentication memory formed integrally with the processor core, and storing first authentication information utilized for authentication of the processor core, and the memory including
- a non-volatile memory storing information utilized by the processor core,
- a second authentication memory formed integrally with the non-volatile memory, and storing second authentication information for authentication of the processor core,
- an authentication information acquiring section configured to acquire the first authentication information,
- a processor authenticating section configured to compare the first authentication information acquired by the authentication information acquiring section and the second authentication information to authenticate the processor core,
- a processor access controlling section configured to permit an access from the processor core when the processor authenticating section succeeds in authentication, and
- a processing unit configured to execute the authentication information acquiring section, the processor authenticating section and the processor access controlling section, wherein the first authentication memory and the processor core are formed on a first device, the second authentication memory and the non-volatile memory are formed on a second device, and the system large scale integrated circuit and the memory are formed separately from each other, wherein the memory operates by electric power supplied from a power supply that supplies electric power to the non-volatile memory and a capacitor that supplies electric power to the non-volatile memory when the supply of electric power from the power supply to the non-volatile memory stops, and the memory further comprises
- a power supply suspension detecting section configured to detect a timing of suspension of the supply of electric power from the power supply,
- an authentication information generating section configured to generate the second authentication information before the timing of the suspension of the supply of electric power, and
- a transferring section that transfers the second authentication information generated by the authentication information generating section to the first authentication memory before the timing of the suspension of the supply of electric power, wherein the second memory stores the second authentication information generated by the authentication information generating section.

* * * * *